(12) United States Patent
Pavlak et al.

(10) Patent No.: US 11,101,651 B2
(45) Date of Patent: Aug. 24, 2021

(54) SYSTEMS AND METHODS USING DECISION ANALYSIS FOR CONTROLLING ENERGY CONSUMPTION AND FACILITATING BUILDING PARTICIPATION IN ANCILLARY ENERGY MARKETS

(71) Applicants: QCoefficient, Inc., Chicago, IL (US); The Regents of the University of Colorado, Denver, CO (US)

(72) Inventors: Gregory S. Pavlak, East Grand Rapids, MI (US); Gregor P. Henze, Boulder, CO (US); Vincent J. Cushing, Chicago, IL (US)

(73) Assignees: QCoefficient, Inc, Chicago, IL (US); The Regents of the University of Colorado, Denver, CO (US)

( * ) Notice: Subject to any disclaimer, the term of this patent is extended or adjusted under 35 U.S.C. 154(b) by 678 days.

(21) Appl. No.: 14/801,824

(22) Filed: Jul. 17, 2015

(65) Prior Publication Data
US 2018/0219374 A1    Aug. 2, 2018

Related U.S. Application Data

(60) Provisional application No. 62/133,979, filed on Mar. 16, 2015, provisional application No. 62/025,079, (Continued)

(51) Int. Cl.
*H02J 3/00*      (2006.01)
*G05B 15/02*      (2006.01)
(Continued)

(52) U.S. Cl.
CPC .............. *H02J 3/00* (2013.01); *G05B 13/045* (2013.01); *G05B 15/02* (2013.01); *G06Q 10/067* (2013.01);
(Continued)

(58) Field of Classification Search
None
See application file for complete search history.

(56) References Cited

U.S. PATENT DOCUMENTS

2014/0330695 A1*   11/2014   Steven ............... G06Q 30/0283
                                                               705/37
2017/0358041 A1*   12/2017   Forbes, Jr. ............ B60L 11/184

* cited by examiner

*Primary Examiner* — Matthew E. Gordon
(74) *Attorney, Agent, or Firm* — David J. Cushing

(57) ABSTRACT

Building energy consumption is controlled by operating energy consumptive devices according to a control plan determined by: using a software building model to simulate building behavior over a simulation period in accordance with predicted circumstances and in accordance with multiple control plans; for at least one of the control plans, re-simulating building behavior a plurality of times each with a different perturbation imposed, with each perturbation corresponding to a different degree of participation in a grid market, to thereby determine an amount of participation in the grid market available to the building; resimulating building behavior a plurality of times imposing said determined participation amount as a constraint; and selecting an optimal control plan based on the last round of resimulations. The selected optimal control plan may also be derived through combining buildings or energy response attributes associated with different buildings to form synthetic resources for optimal deployment to the grid.

14 Claims, 26 Drawing Sheets

Related U.S. Application Data filed on Jul. 16, 2014, provisional application No. 62/025,072, filed on Jul. 16, 2014.

(51) Int. Cl.
*G06Q 50/06* (2012.01)
*G06Q 10/06* (2012.01)
*G05B 13/04* (2006.01)
*H02J 3/14* (2006.01)

(52) U.S. Cl.
CPC ..... *G06Q 50/06* (2013.01); *G05B 2219/2642* (2013.01); *H02J 3/14* (2013.01); *H02J 2203/20* (2020.01)

SYSTEMS AND METHODS USING DECISION ANALYSIS FOR CONTROLLING ENERGY CONSUMPTION AND FACILITATING BUILDING PARTICIPATION IN ANCILLARY ENERGY MARKETS

CROSS REFERENCE TO RELATED APPLICATIONS

This application claims priority to U.S. Prov. Appl. No. 62/025,072 entitled "OPTIMIZING COMMERCIAL BUILDING PARTICIPATION IN ENERGY AND ANCILLARY SERVICE MARKETS," filed on Jul. 16, 2014; U.S. Prov. Appl. No. 62/025,079, entitled "BUILDING-TO-GRID INTEGRATION THROUGH COMMERCIAL BUILDING PORTFOLIOS PARTICIPATING IN ENERGY AND FREQUENCY REGULATION MARKETS," filed on Jul. 16, 2014; and U.S. Prov. Appl. No. 62/133,979 entitled "EVALUATING SYNERGISTIC EFFECT OF OPTIMALLY CONTROLLING COMMERCIAL BUILDING THERMAL MASS PORTFOLIOS," filed on Mar. 16, 2015, each of which is incorporated by reference herein. This application is related to U.S. application Ser. No. 13/404,748, entitled "INTEGRATION OF COMMERCIAL BUILDING OPERATIONS WITH ELECTRIC SYSTEM OPERATIONS AND MARKETS", filed on Feb. 24, 2012, and to U.S. application Ser. No. 13/405,153 entitled "OPTIMIZATION OF ATTRIBUTES IN A PLURALITY OF COMMERCIAL AND INDUSTRIAL FACILITIES," filed Feb. 24, 2012, the disclosures of which are also incorporated by reference herein.

BACKGROUND OF THE INVENTION

The present invention relates to optimizing energy usage of commercial buildings containing energy consuming devices. The invention is particularly directed to apparatus and methods using model predictive control (MPC) to optimize energy usage and to more effectively participate in grid markets.

Global electricity demand will increase significantly over the next several decades, driving a need for both more efficient energy usage as well as transitioning to greater renewable electricity generation. Traditional electricity generation sources (e.g., coal, gas and nuclear) produce fairly consistent output for known quantities of input fuel, which allows reliable scheduling of such supply resources to accommodate changing and uncertain consumer demand. Predictable generation sources can be controlled and dispatched to maintain power system balance, ensuring a reliable supply of electricity. But even with traditional electricity sources, reliability does not equate to efficiency, with the generation to satisfy peak demand often being quite costly while on the other hand significant electricity generated during very low demand time (e.g., at night) is wasted. The temporal mismatch between supply and demand is significantly aggravated by the introduction of renewable generation sources such as wind and solar whose outputs are inherently variable. If not properly integrated, large quantities of variable generation may result in power quality issues, power flow imbalances, and grid stability issues.

One evident solution to accommodate the variable nature of wind and solar resources is to provide storage capacity. Grid storage technologies such as pumped-hydro, compressed air, and grid-scale batteries allow variable generation to be captured when a resource is available and dispatched as demand necessitates. Buildings contain significant thermal mass that can be utilized as a valuable distributed storage asset for a variety of applications. At the building level, thermal mass storage can be purposed to tasks such as peak demand management, demand response, and increasing energy efficiency through optimizing HVAC operations. Multiple building thermal mass resources can also be aggregated and operated in concert to achieve grid-scale objectives such as mitigating transmission congestion and the associated real-time nodal price spikes, shifting demand to increase renewable utilization, and displacing inefficient peaking or marginal generating equipment. Achieving such grid-level benefits may require a higher degree of orchestration and a shift in perspective from individual to holistic optimality.

Optimal control of building thermal mass has been the subject of much research over the past two decades. It has been shown that optimal thermal mass control, particularly with pre-cooling strategies that take advantage of time-of-use energy pricing, has the potential for significant savings by applying dynamic optimization to computer simulations.

In general, past work in optimal building control has typically viewed buildings as independent entities consuming grid resources to meet the needs of their respective tenants. Optimal strategies were developed considering a single building's ability to shift load, resulting in savings evaluations performed at the facility level. This operation, while optimal in the individual sense, neglects the fact that buildings are all connected to the same electric grid. The aggregation of individual optimal solutions may in fact be suboptimal when considering the characteristics and operations of other buildings and viewing the problem from a communal perspective.

The potential benefits of a multi-building outlook were explored by ASHRAE RP-1146, which sought to 1) identify situations where managing total multi-building electric demand through load aggregation was attractive, and 2) investigate control strategies that would further reduce energy costs at the aggregate level. Load aggregation may seek to benefit from the fact that the coincident peak load is not necessarily the sum of individual load peaks (i.e. demand diversity). Significant further savings and other advantages may arise from the combined use of load aggregation and load curtailment, e.g., simultaneous lighting power, equipment power, and ventilation rate reductions as well as temperature setpoint increases.

In addition to bulk load shifting and shaping, recent work has also suggested that the flexibility available in commercial building electric demand can be used to provide electric grid balancing and ancillary services, e.g., day-ahead non-spinning reserve market, and grid frequency regulation. In general, the surveyed literature depicts buildings as becoming more active and responsive grid participants through the development of enabling technologies and intelligent control paradigms. The literature also highlights the challenge of integrating and orchestrating an increasing number of intelligent systems and subsystems, to achieve higher levels of system-wide efficiency.

Buildings are diverse in physical design and operation, and a high level of coordination may be necessary to achieve the maximum overall benefit by unlocking opportunities to cooperate on achieving joint objectives. More than simply providing a demand response mechanism, model predictive control of building portfolios provides a framework for optimally managing multi-building load resources such that greater benefits can be provided to building owners and the electric grid than when optimizing buildings independently. By giving the optimizer the knowledge of all unique building characteristics available within a portfolio of buildings, various features may be exploited to orchestrate an optimal combined operation of all portfolio members. What has not been heretofore explored is the concept that diversity among building characteristics and operations creates opportunities for synergy.

Operating a reliable and effective large-scale electric power system requires the procurement and scheduling of resources over several time scales. Long-term planning secures the availability of adequate generation capacity to meet changing consumer needs, while short-term scheduling and dispatch activities ensure real-time stability through continuously balancing electricity supply and demand. In addition to the scheduling of generation capacity, various ancillary services, such as frequency regulation, spinning reserves, voltage control, and black start, are required to maintain power system reliability. Frequency regulation ancillary service is responsible for correcting small deviations between supply and demand that occur on minute or sub-minute time scales, while spinning and non-spinning reserve services provide a safeguard against generator failures and contingency events.

Historically, demand resources have played a relatively inflexible role in energy and ancillary service markets, requiring grid balancing operations to be achieved solely through modulation of generating resources. However, response from flexible loads may be able to provide ancillary services in a more accurate, reliable, and prompt manner than traditional generation equipment, which may ultimately reduce ancillary service requirements without compromising reliability. Additional benefits of incorporating flexible load response into energy markets may also include: increased system reliability, improved market efficiency, risk management, reduced environmental emissions, market power mitigation, and increased system efficiencies.

As noted above, it is known that significant peak electric demand reductions can be achieved through utilizing building mass as a thermal storage medium. Building energy simulation programs have been coupled with optimization routines in a MPC framework to determine zone temperature setpoint strategies that minimize building utility cost considering time-of-use electric rates and peak demand charges. Real-time pricing scenarios have also been considered, creating a link between building operations and energy market pricing signals.

Aside from the benefits achieved through load shifting and price response, buildings with significant thermal mass may also be well-suited to provide ancillary services, since zone thermal inertia can buffer intermittent or varied HVAC operation. Residential air conditioners have been evaluated for providing spinning reserve services, and a pilot study successfully bid commercial building demand response into day-ahead non-spinning reserve markets.

Recent work has also considered controllable building electric loads for economic dispatch in energy markets. As an example, chilled water supply temperature can be modified to create changes in electric demand. Frequency regulation (FR) in commercial buildings through zone temperature and duct static pressure setpoint modulation has also recently been investigated, An overview of the FERC Order 755 "pay-for-performance" rule, as implemented in PJM, was provided highlighting the opportunity for buildings to be compensated for faster and more accurate response to regulation dispatch. Detailed thermal zone and HVAC models were used to evaluate building response while tracking a FR signal. Similar work has also proposed combining the regulation signal with a variable speed fan control signal to directly modulate fan speed.

It has been proposed to couple a building control and automation system with a software model of the building used to predict or simulate building energy use as a function of multiple possible building control signals, while an optimization algorithm operating in conjunction with the building model selects an optimum set of control signals to minimize energy use or expense at the meter, in an approach known as model predictive control (MPC). See, in particular, U.S. patent application Ser. Nos. 13/404,748 and 13/405,153, cited above, proposing systems and methods not only for minimizing energy usage but for intelligent integration of commercial building operations with the electric system to increase efficiency and enable renewable generation.

The present invention is directed to improved MPC methods of optimizing building energy usage and grid market participation, particularly frequency regulation markets.

SUMMARY OF THE INVENTION

The present invention proposes a model-based methodology to estimate the capability of commercial buildings to participate in ancillary service markets, e.g., frequency regulation, and the integration of this methodology into a supervisory model predictive controller to optimize building operation in consideration of energy prices, demand charges, and ancillary service revenue. The supervisory control problem is extended to building portfolios to evaluate opportunities for synergistic effect among multiple, centrally-optimized buildings.

For commercial buildings to participate in ancillary service markets it is necessary to estimate the quantity of service that is able to be provided. It is also necessary to develop operational strategies that optimally balance revenue generating opportunities with expense (or energy) reducing objectives (e.g. following a frequency regulation signal may increase peak demand if not planned carefully). In pursuit of integrating commercial building operation with energy and ancillary service markets, the present invention presents: (1) a model-based approach for estimating the hourly capability of a commercial building to participate in the regulation ancillary service market, and (2) a model predictive control (MPC) framework for optimizing commercial building participation in both energy and ancillary service markets.

According to this aspect of the invention, a model predictive control (MPC) system simulates operation of a building and its controllable components in accordance with a plurality of control plans over a period of time and under predicted circumstances (e.g., ambient conditions), without participation in a particular grid market, to obtain a first set of building behavior results, simulates operation of the building and its controllable element(s) over the same period of time but with circumstances modified to reflect participation in at least one grid market to obtain a second set of building behavior results, comparing said first and second sets of building behavior results, selecting an optimal control plan based on the comparison, and controlling the controllable components of the building in accordance with the optimal control plan.

The above method could be implemented by simulating operation of the building in accordance a plurality of control plans to obtain a first set of building behavior results, obtaining additional set(s) of building behavior results each corresponding to simulation with modified circumstances, and then selecting a final optimal control plan from all of the building behavior results. Alternatively, a first optimal control plan could be selected from the first set of building behavior results, then a second set of building behavior results obtained corresponding to a first perturbation, a second optimal control plan determined based on the second set of results and the first and second optimal control plans compared to determine a "survivor," and so forth, with the final survivor being used for the control program sent to the building.

A purpose of the perturbation and simulation according to the invention may be to determine an amount of participation in a grid market to which the building can participate before an undesirable penalty is incurred.

The invention further presents a simplified mechanism for taking advantage of diversity amongst buildings in a portfolio. In order to achieve a sustainable energy future, advanced control paradigms will be critical at both building and grid levels to achieve harmonious integration of energy resources. This present invention recognizes the potential for synergistic effects that may exist through communal coordination of commercial building operations. A framework is presented for diurnal planning of multi-building thermal mass and HVAC system operational strategies in consideration of real-time energy prices, peak demand charges, and ancillary service revenues. Optimizing buildings as a portfolio can achieve significant additional cost savings over individually optimized cases, depending on the circumstances. The magnitude and nature of synergistic effect is ultimately dependent upon the portfolio construction, grid market design, and the conditions faced by buildings when optimized individually. Enhanced energy and cost savings opportunities are possible by taking the novel perspective of optimizing building portfolios in multiple grid markets, motivating the pursuit of future smart grid advancements that take a holistic and communal vantage point.

To this end, the present invention presents a framework for diurnal planning of multi-building thermal mass and HVAC system operational strategies in consideration of real-time energy prices, peak demand charges, and ancillary service revenues, in order to explore the synergistic effects that may exist through communal coordination of commercial building operations.

Of particular note are (1) aggregating buildings for common analysis/simulation/control based on their different attributes to further a particular objective, and (2) using decision analysis as a way of testing different building aggregations to achieve optimal results.

Finally, in yet a further aspect of the invention, a method is provided of managing energy consumption in a portfolio of facilities, each facility having at least one energy response attribute and at least one controllable component impacting energy consumption by an energy-consuming device serving all of the facilities. This is a situation common in, for example, a university campus. The method comprises the steps of: bundling together a subset of the facilities having different energy response attributes to form at least one representative aggregation; determining an optimal control plan for the representative aggregation, and then controlling all of the buildings in the portfolio based on the optimal control plan.

BRIEF DESCRIPTIONS OF THE DRAWINGS

The invention will be more clearly understood from the following description in conjunction with the accompanying drawings, wherein.

Figure 1:
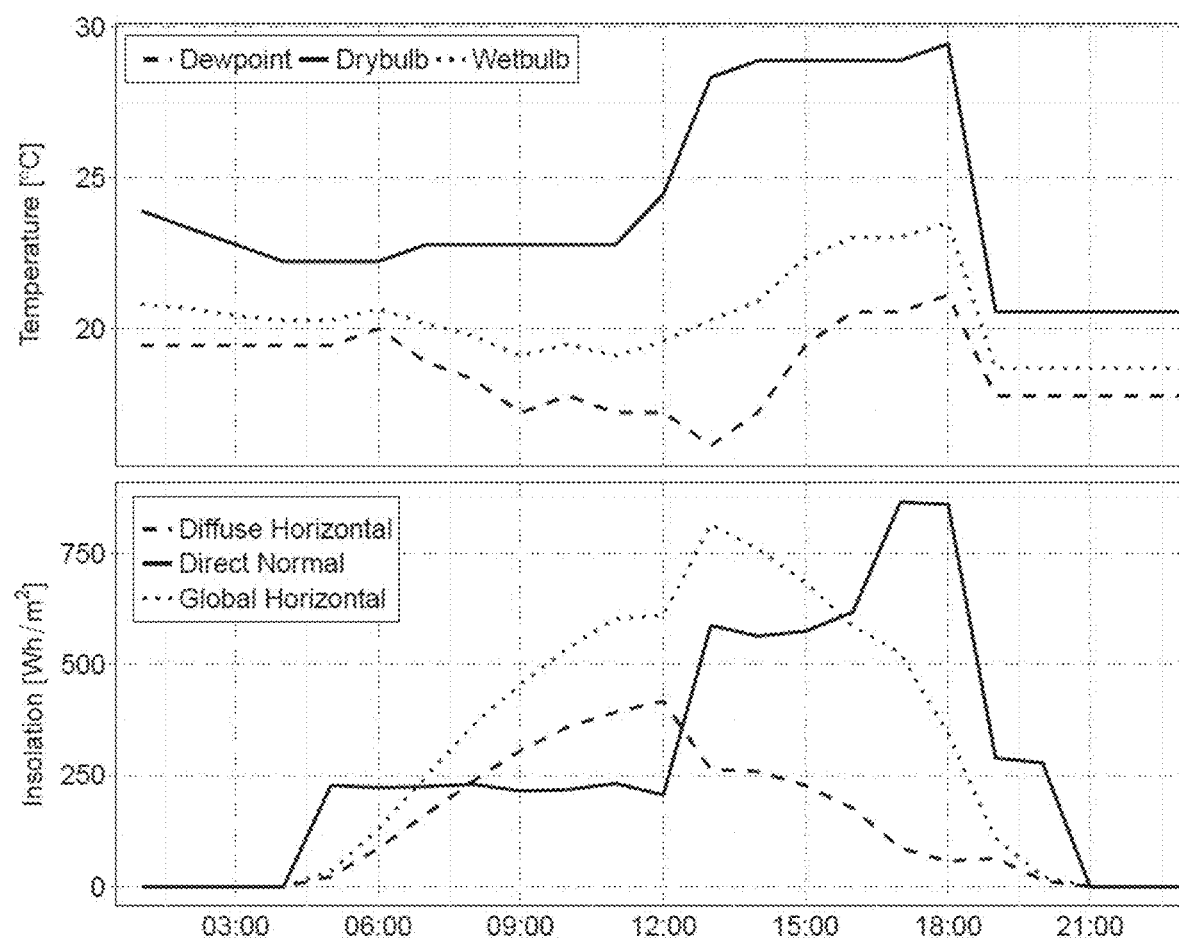
FIG. 1 depicts ambient weather conditions (temperature and solar conditions) for Jun. 24, 2013, to be used in simulating building operation as part of the method according to the invention.
Figure 7:
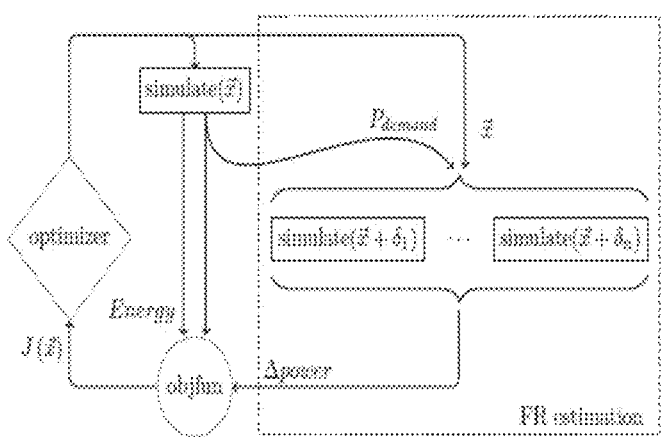
Figure 8:
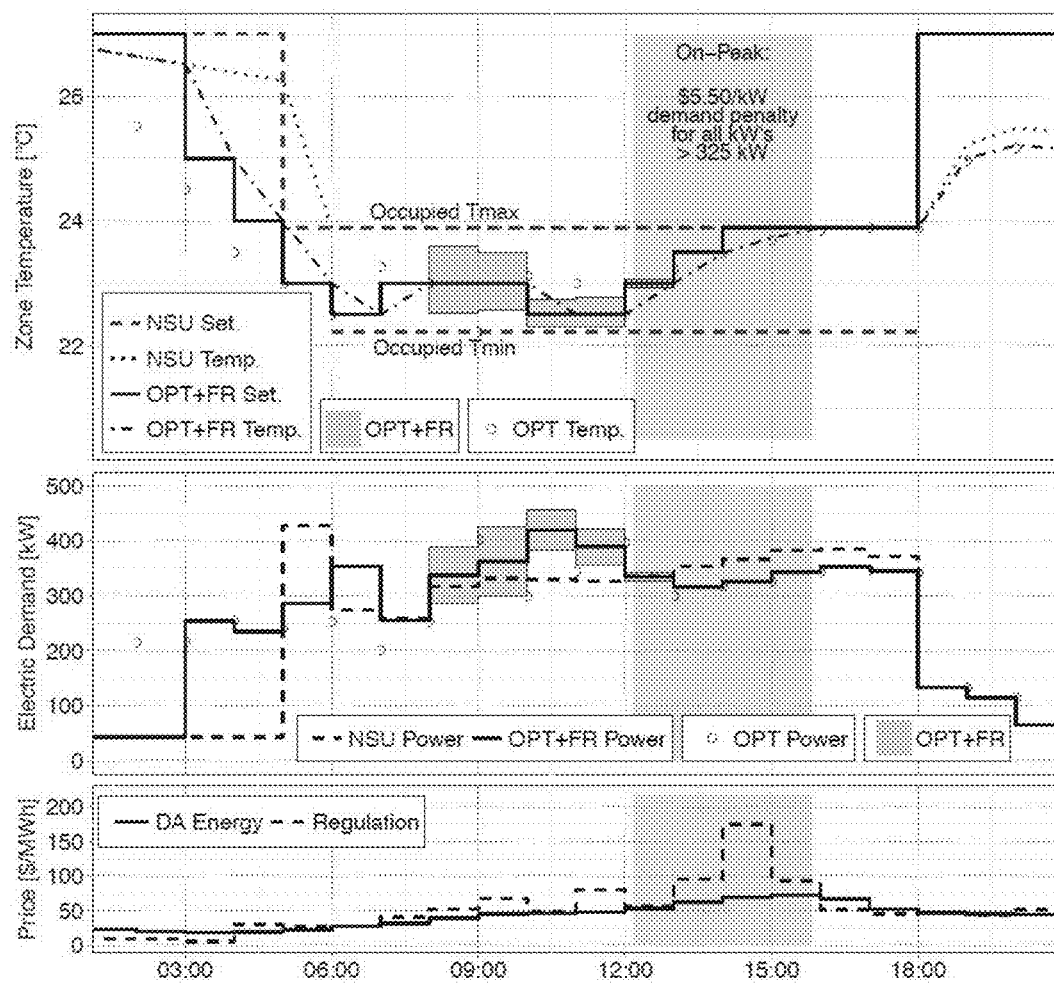
Figure 9:
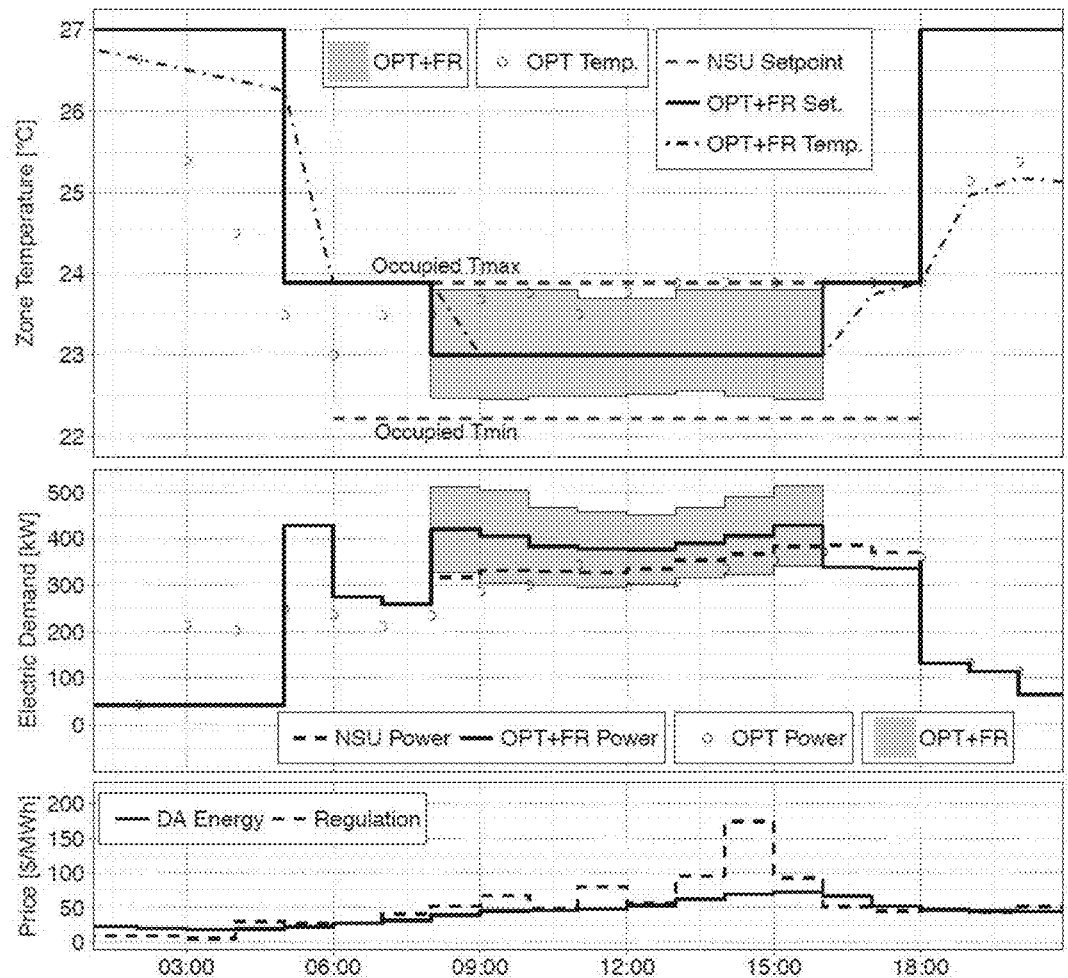
Figure 10:
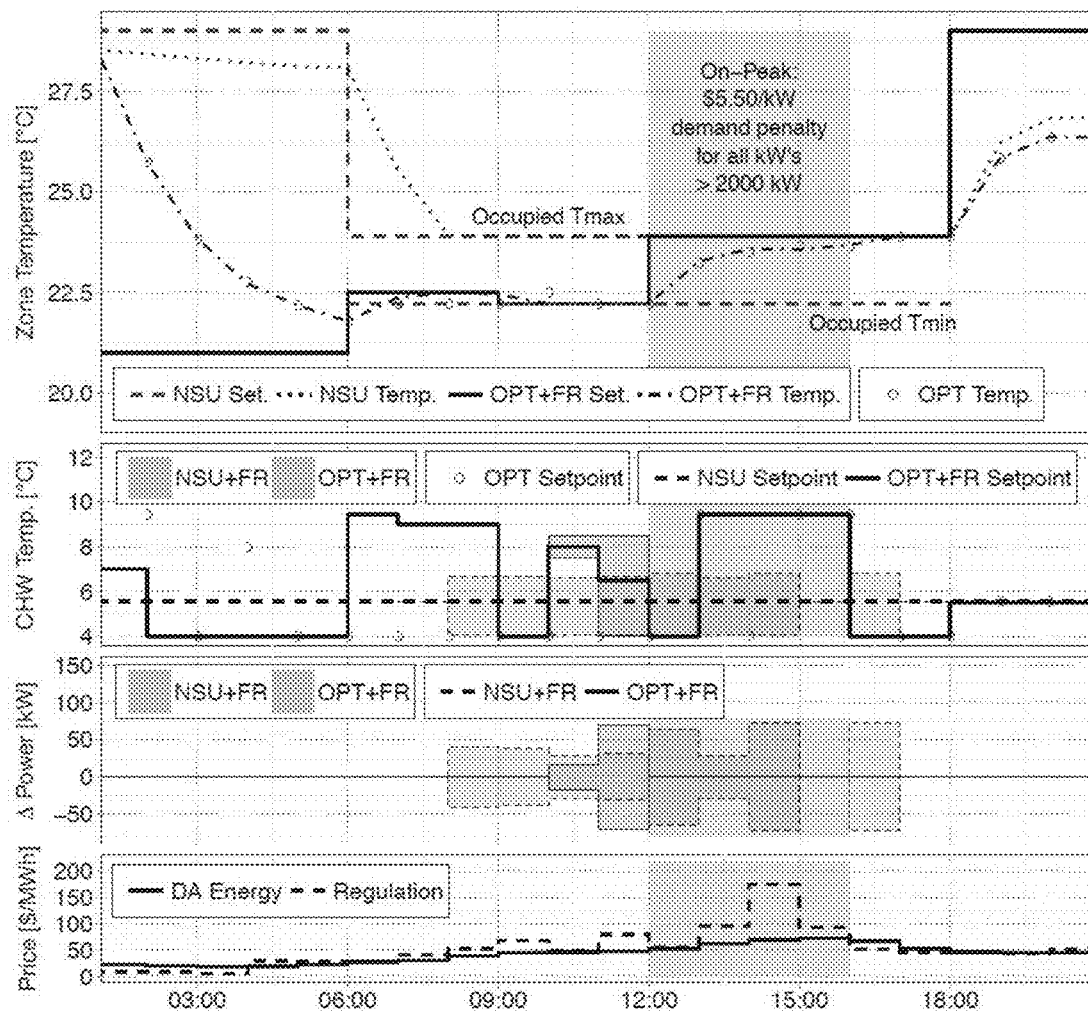
Figure 11:
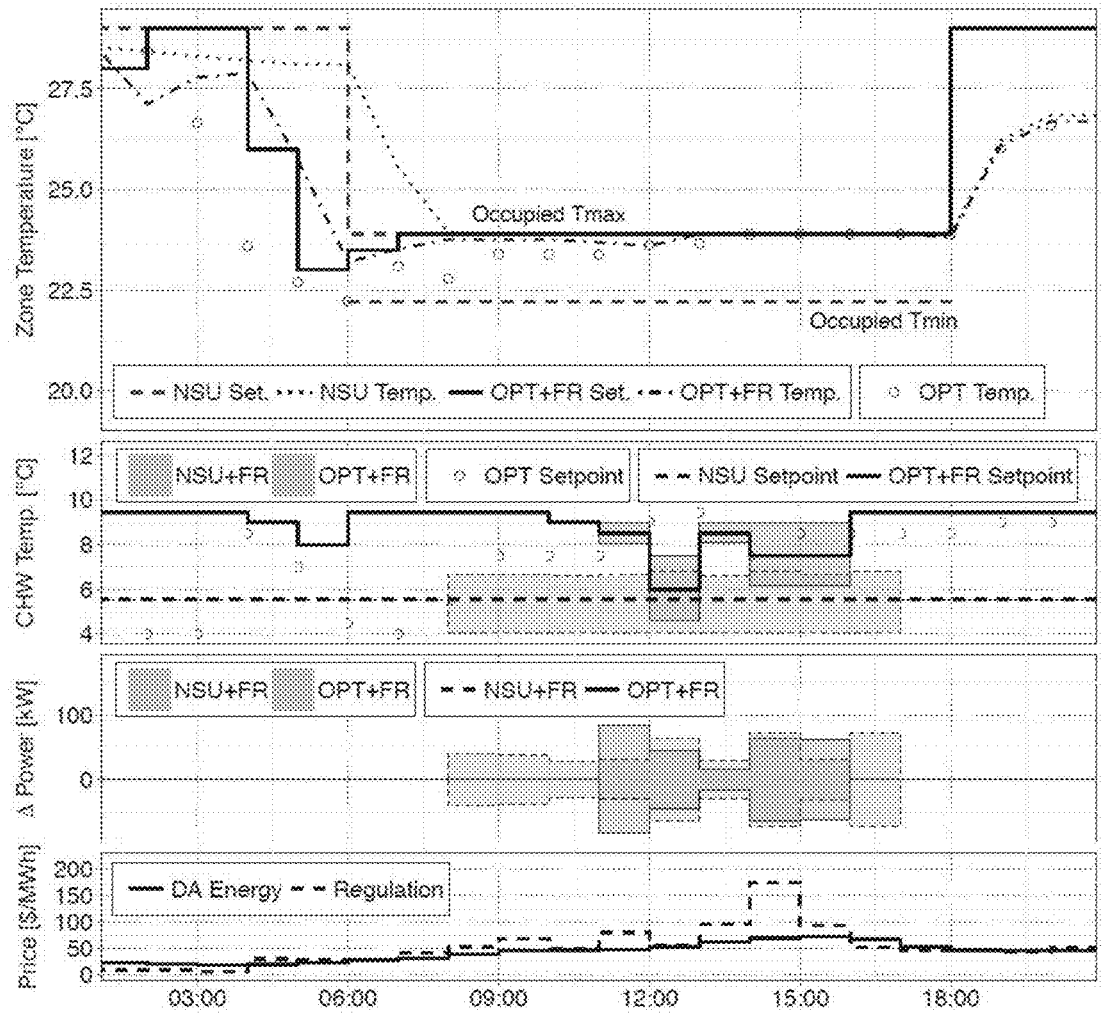
Figure 12:
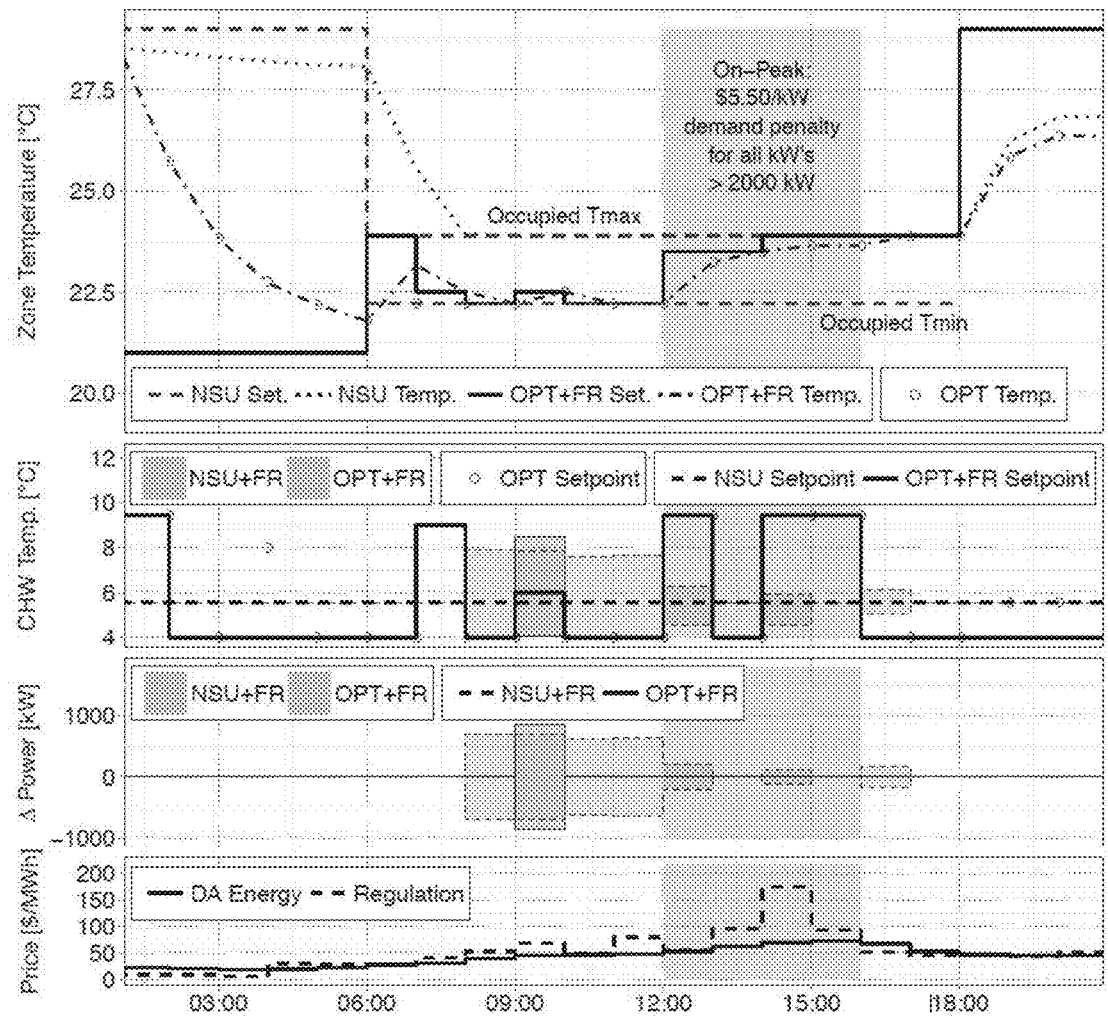
Figure 13:
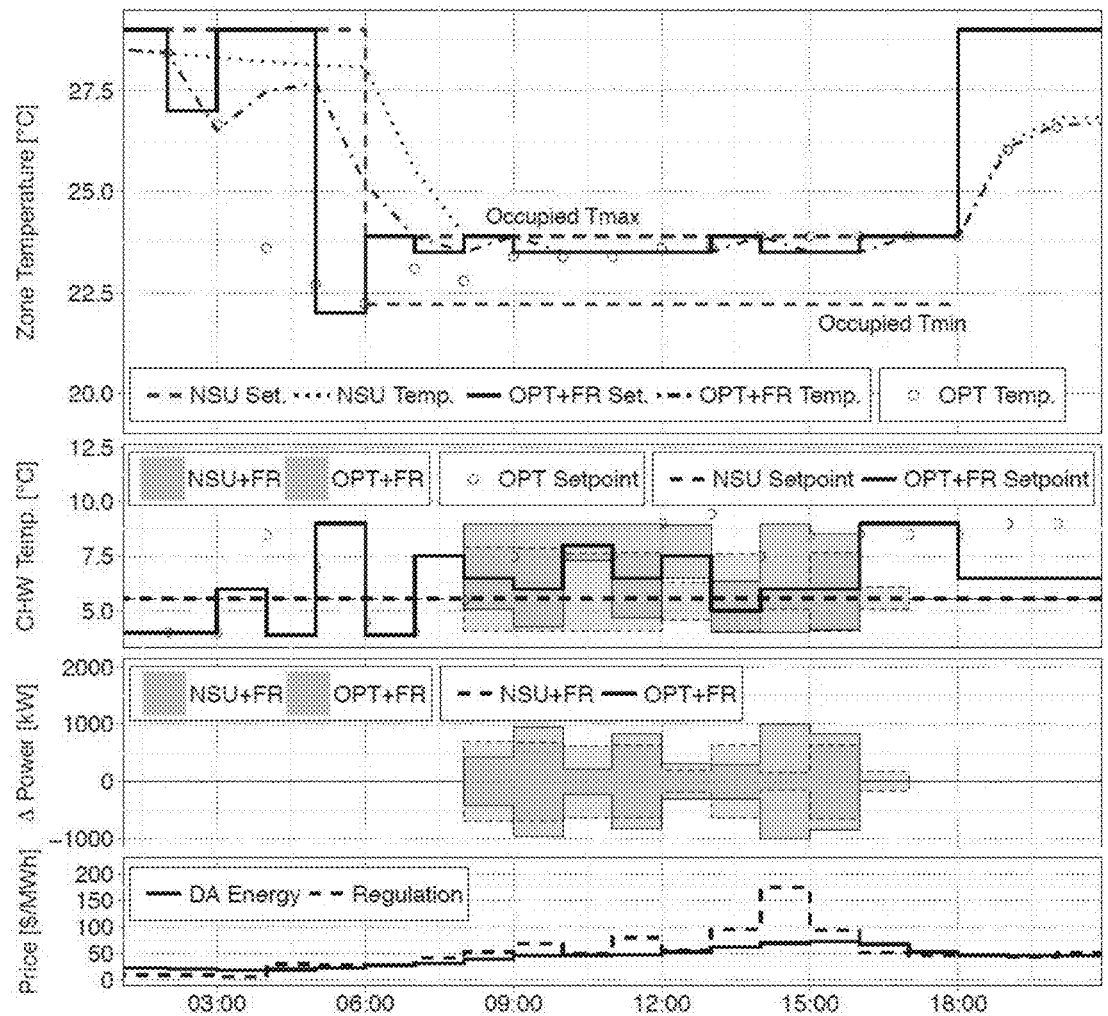
Figure 14:
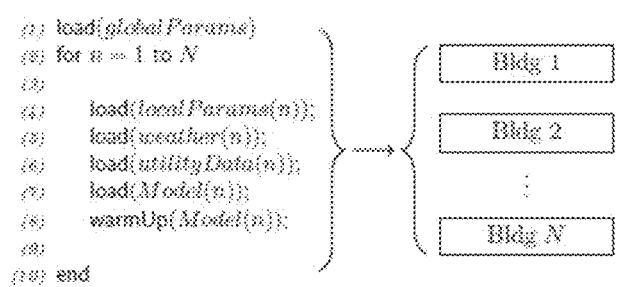
Figure 15:
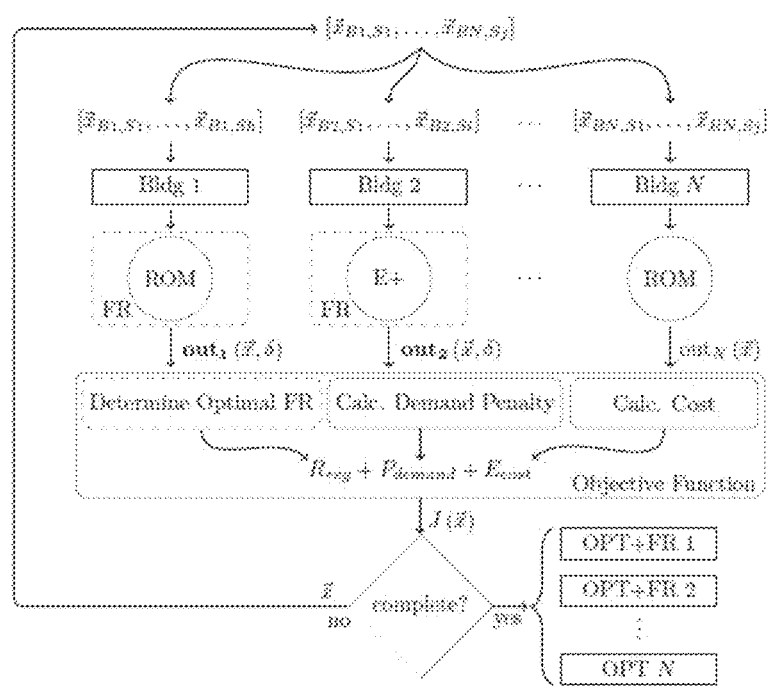
Figure 16:
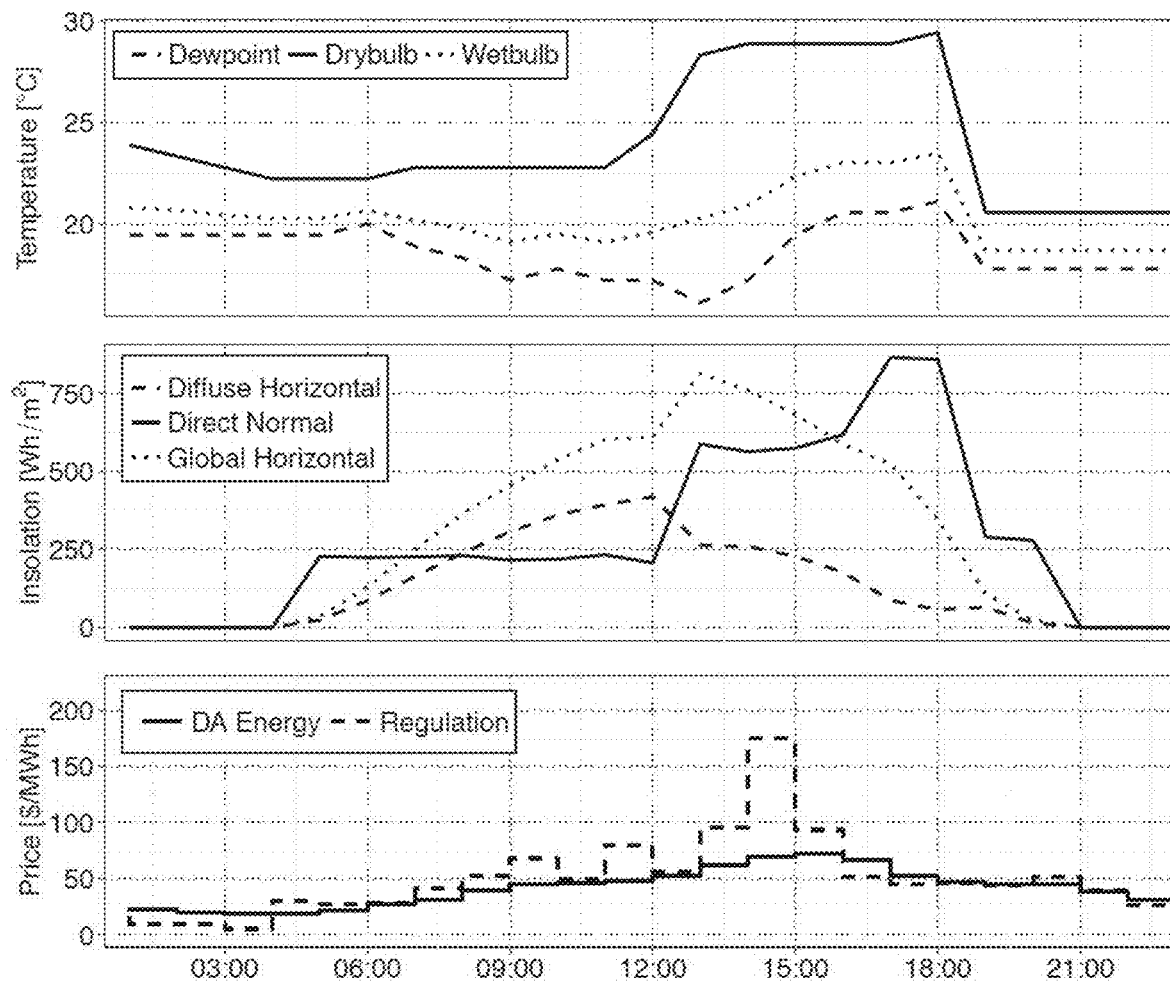
Figure 17:
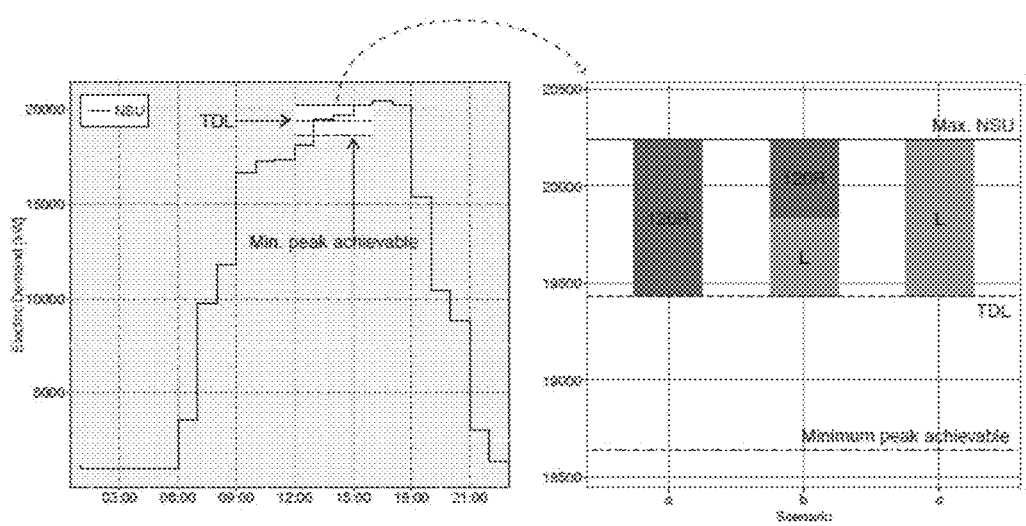
Figure 18:
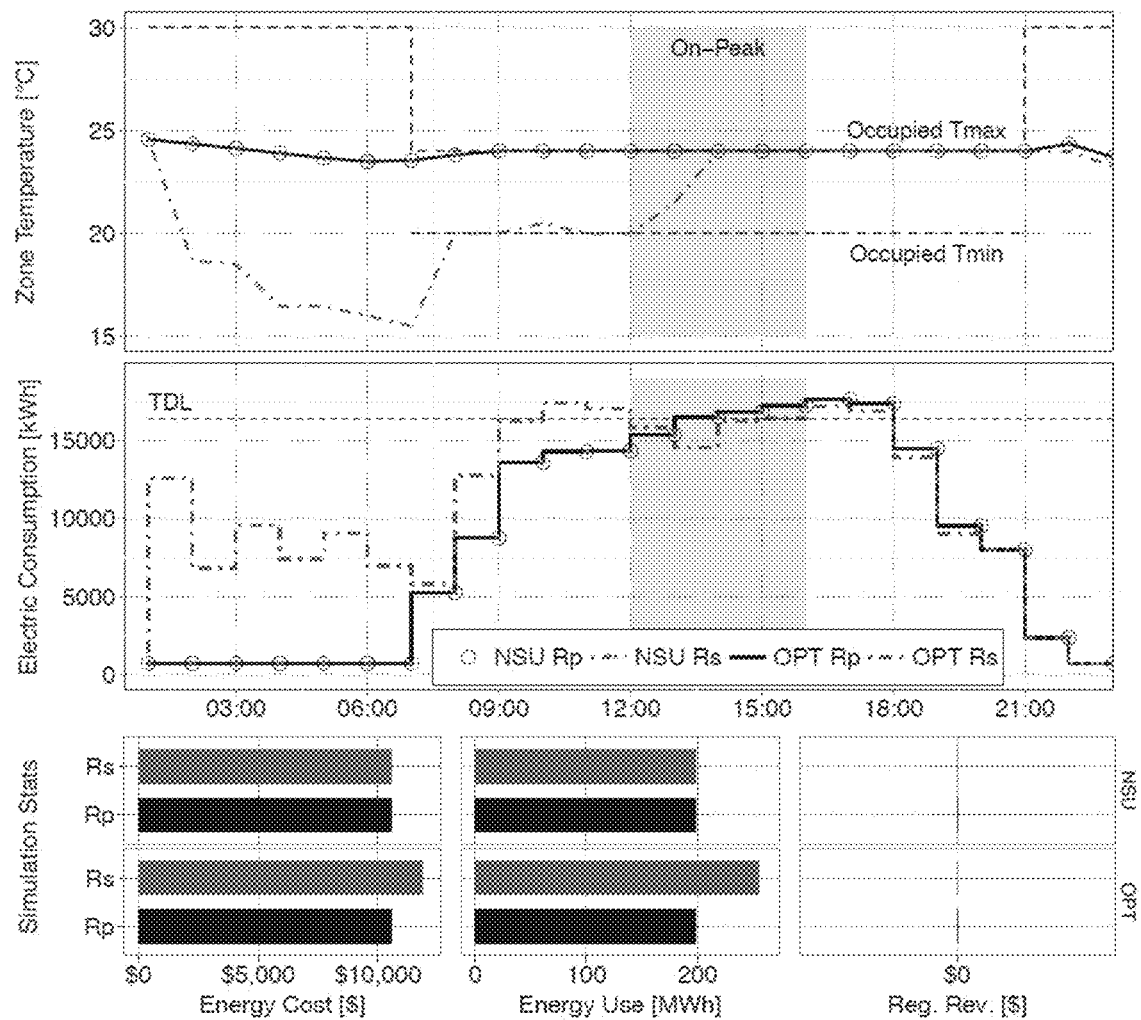
Figure 19:
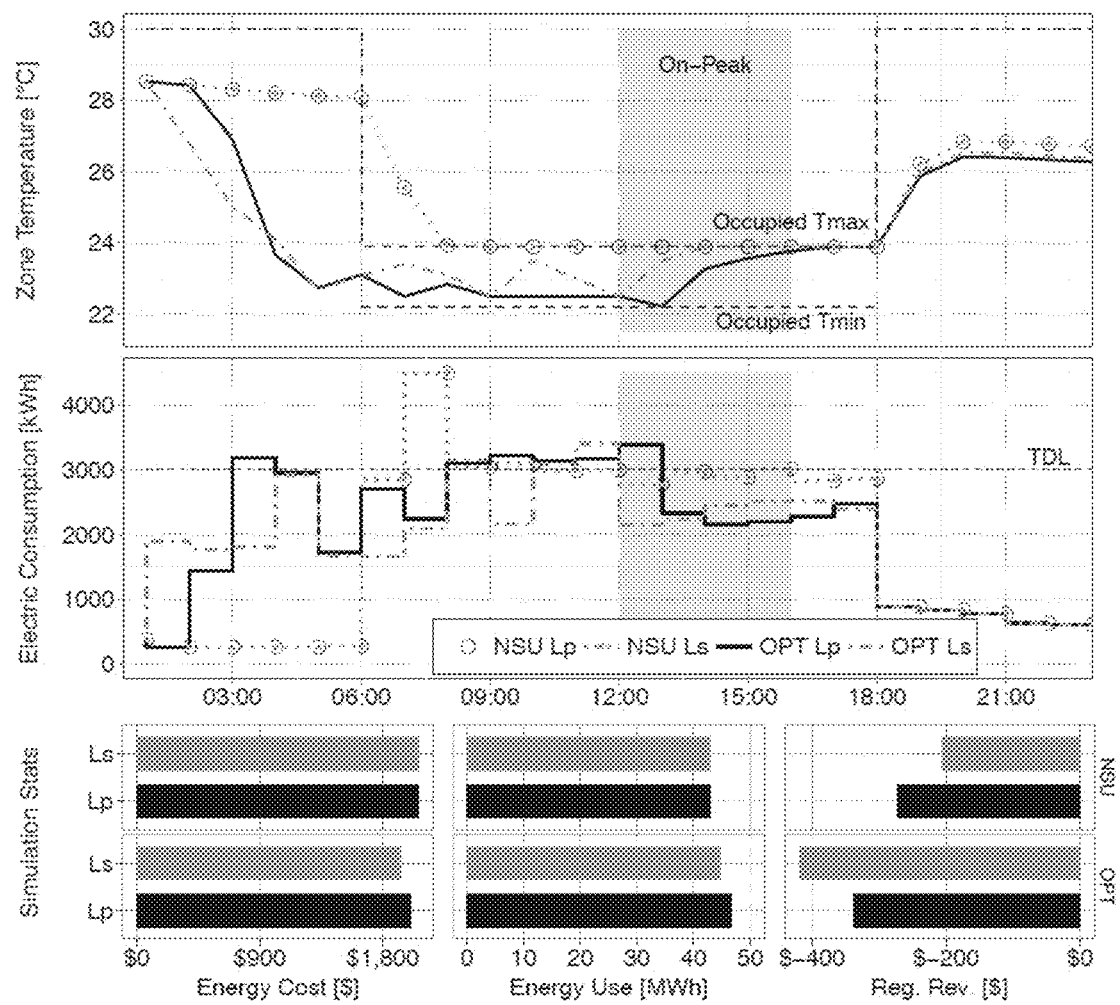
Figure 20:
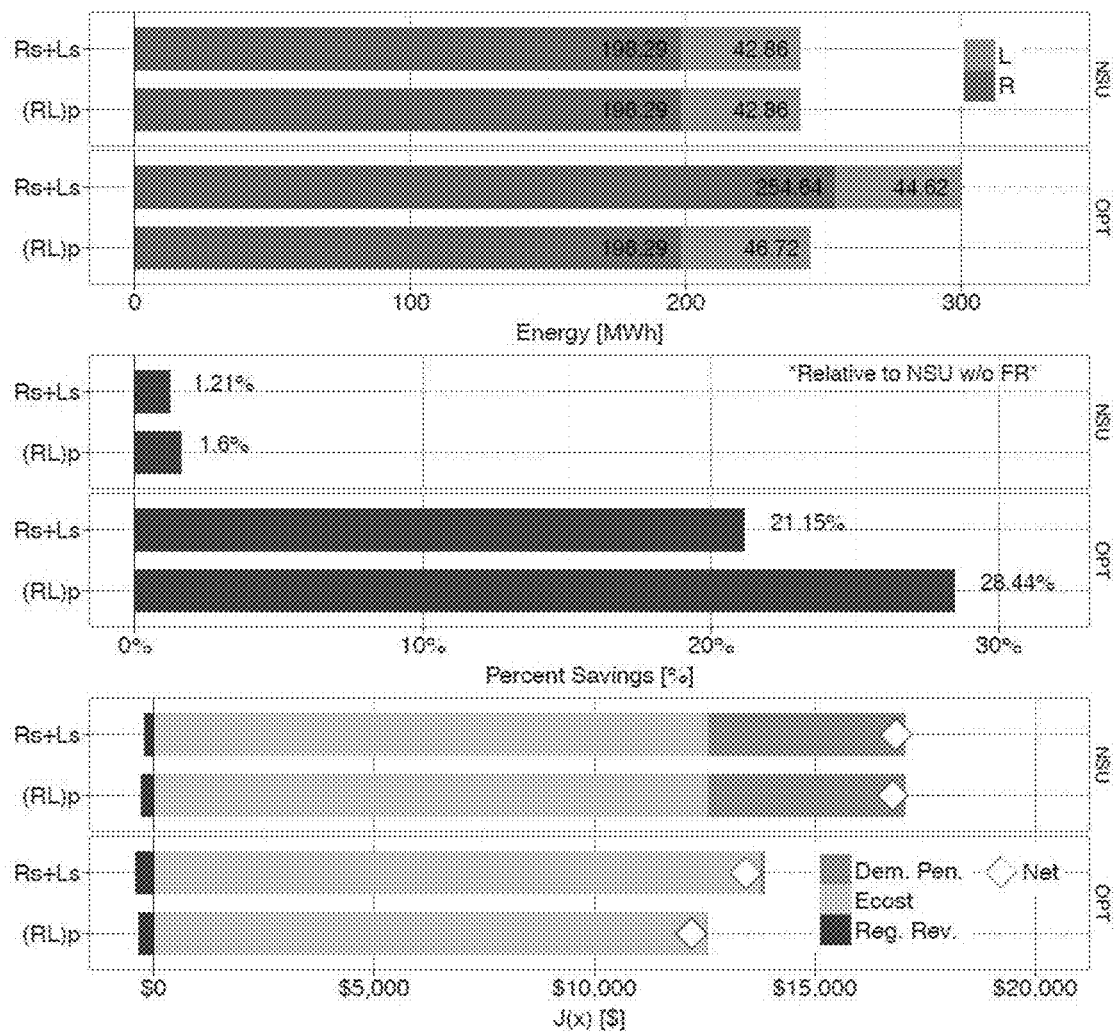
Figure 21:
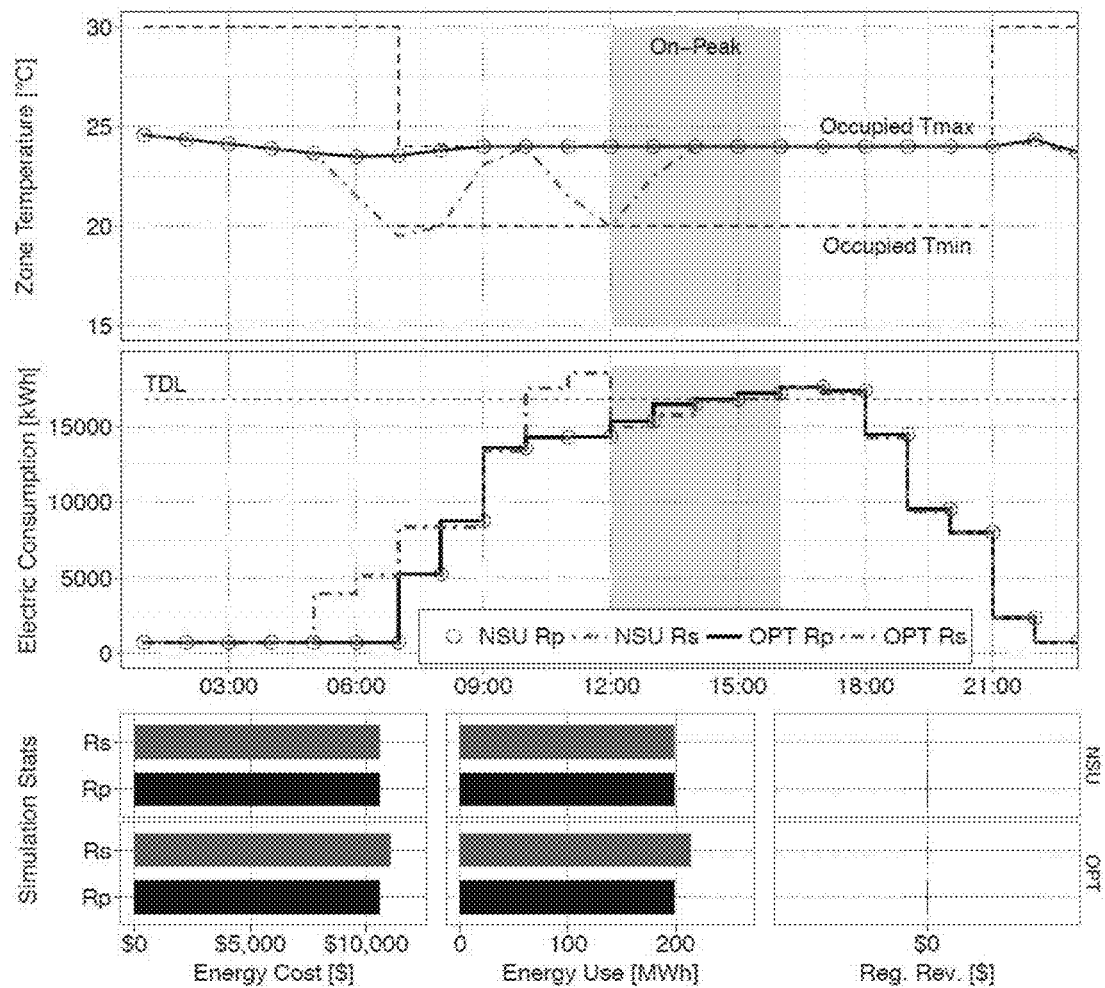
Figure 22:
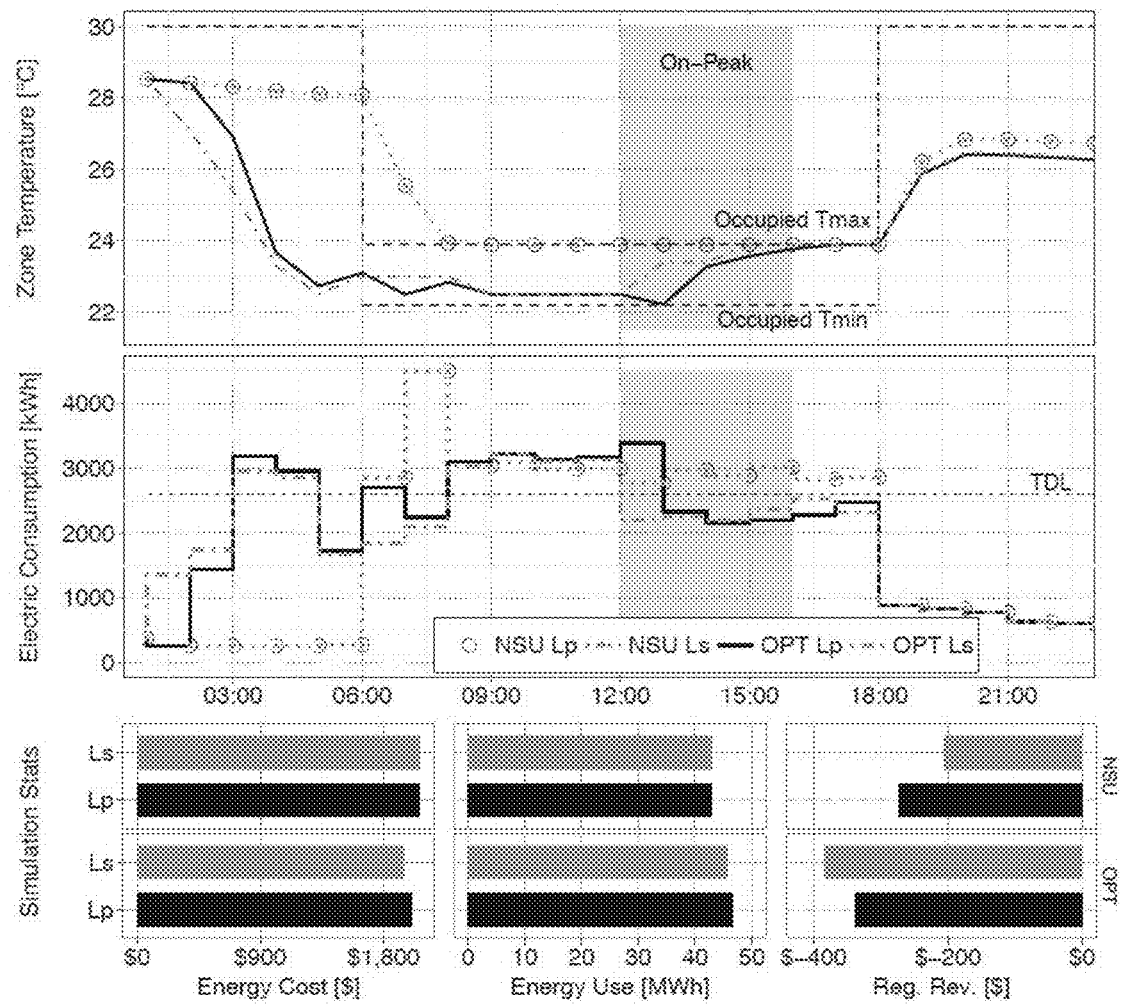
Figure 23:
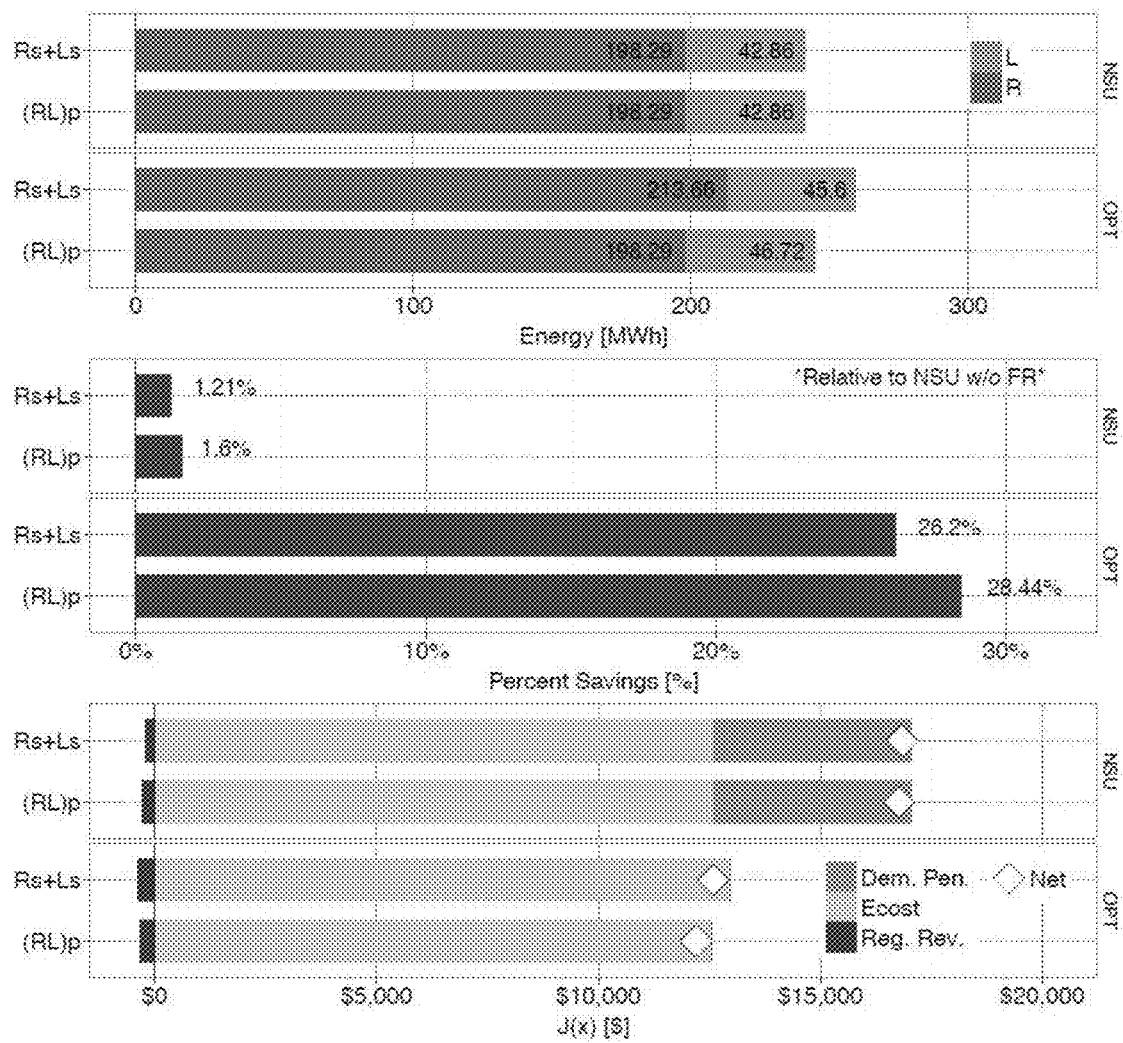
Figure 24:
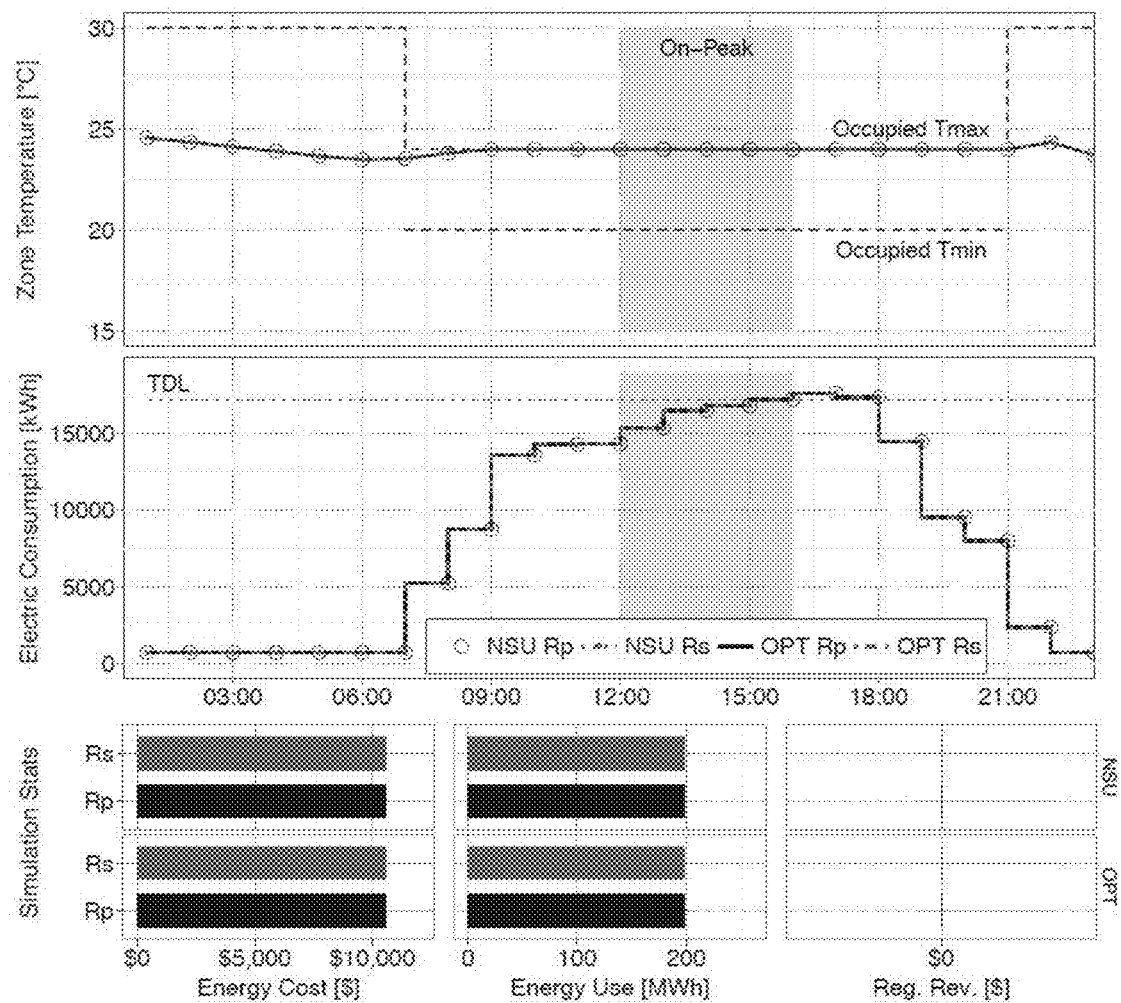
Figure 25:
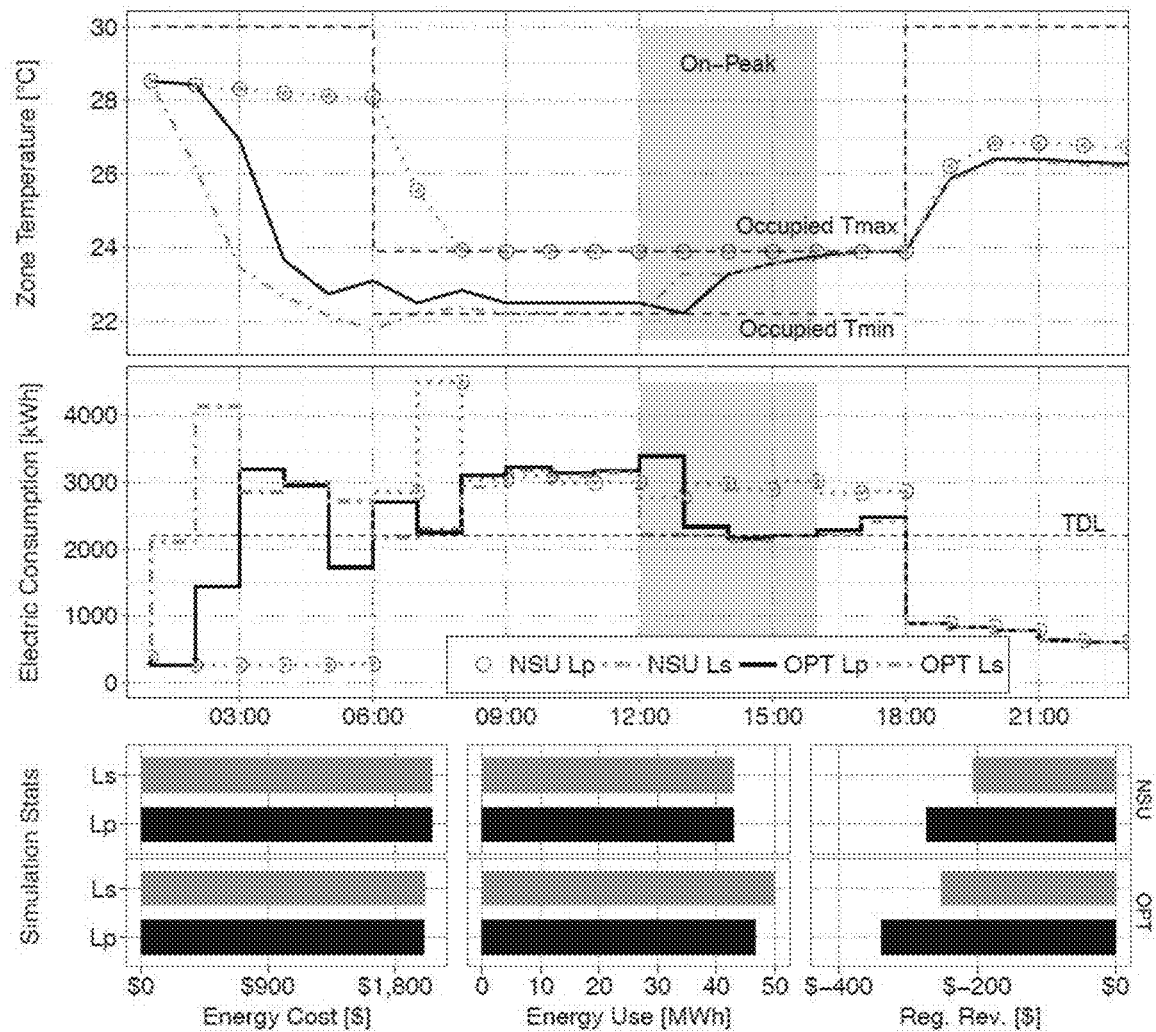
Figure 26:
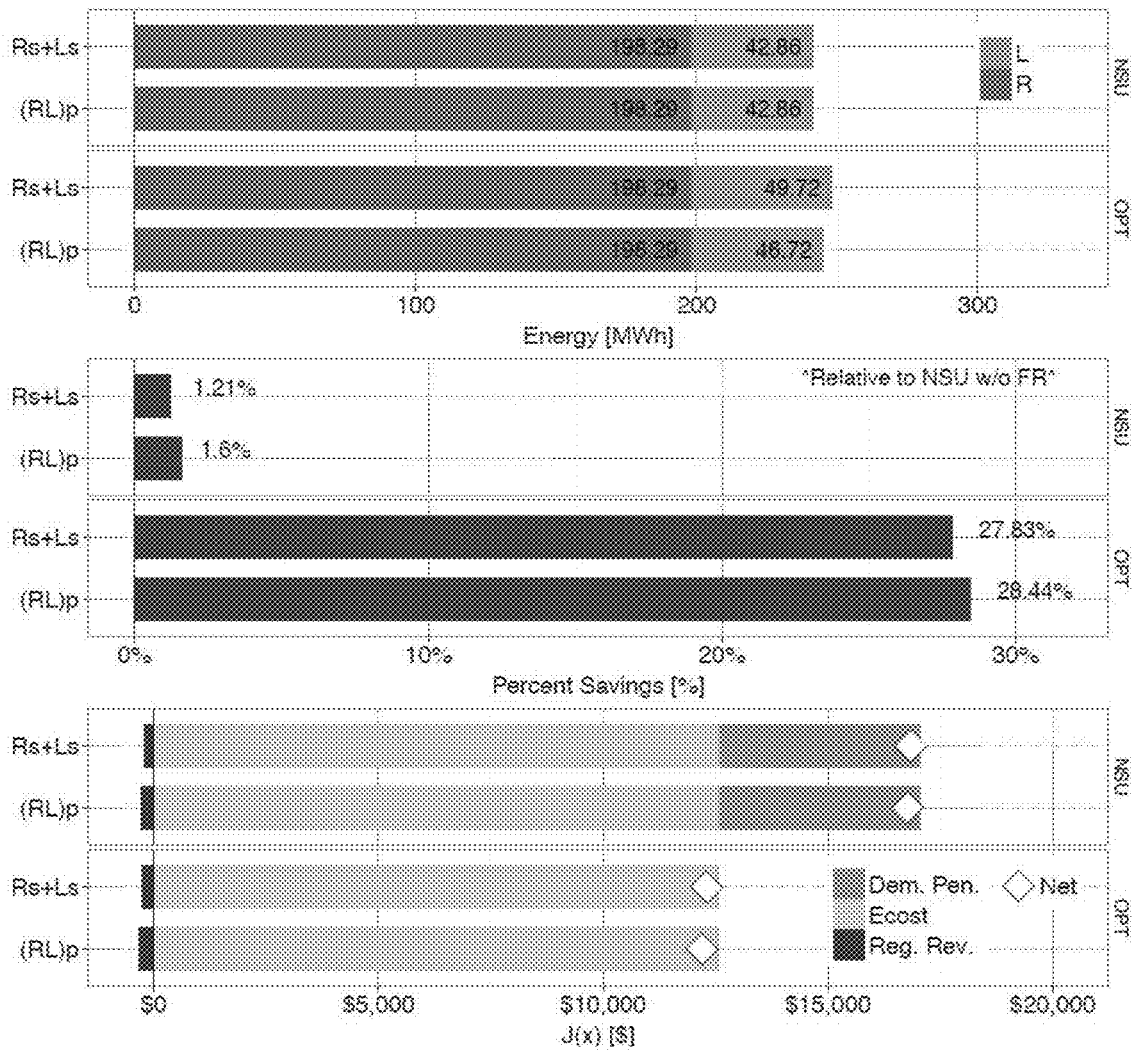

FIG. 7 presents an overview/flow diagram of multi-market optimization with frequency regulation estimation according to the present invention;

FIG. 8 illustrates zone setpoint optimization for a medium size office with frequency regulation and low TDL, for explaining operation of the invention;

FIG. 9 illustrates zone setpoint optimization for a medium size office with frequency regulation and high TDL;

FIG. 10 illustrates zone temperature and setpoint, CHW temperature, power difference and time-of-use energy price for explaining large office optimization with low TDL and steady response frequency regulation estimation;

FIG. 11 is an illustration similar to FIG. 10, but for high TDL;

FIG. 12 is an illustration similar to FIG. 10, but for fast response frequency regulation estimation;

FIG. 13 is an illustration similar to FIG. 12, but for high TDL;

FIG. 14 illustrates pseudocode for initialization of portfolio optimization according to the invention;

FIG. 15 is an illustration of the portfolio optimization process according to one example of the invention;

FIG. 16 is depicts ambient weather conditions to be used in simulating building operation as part of the method according to a further aspect of the invention, similar to FIG. 1 but also showing time-of-use energy pricing;

FIG. 17 illustrates targeted portfolio demand in relation to the absolute minimum achievable demand and peak demand when operating all buildings in a portfolio under a typical night time setback control strategy (NSU);

FIG. 18 illustrates optimization results where a desired portfolio demand reduction for frequency regulation is entirely attributable to the peak reduction needs of retail building;

FIG. 19 illustrates optimization results for a large office building in the scenario represented in FIG. 18;

FIG. 20 illustrates energy consumption, optimizer cost and savings for various optimization cases;

FIG. 21 illustrates retail building optimization results for the case where a large office and retail building contribute equally to the load reduction required for frequency regulation participation;

FIG. 22 illustrates large office building optimization results for the scenario represented in FIG. 21;

FIG. 23 illustrates aggregated individual and portfolio optimization results for the scenario represented in FIGS. 22 and 22, with frequency regulation participation;

FIG. 24 illustrates retail building optimization results for the case where a desired portfolio demand reduction for frequency regulation is entirely attributable to the peak reduction needs of the large office building;

FIG. 25 illustrates large office building optimization results for the scenario represented in FIG. 24; and FIG. 26 illustrates aggregated individual and portfolio optimization results for the scenario represented in FIGS. 24 and 25, with frequency regulation participation;

DETAILED DESCRIPTION OF THE INVENTION

In general, previous work has evaluated the potential for commercial buildings to participate in each energy and ancillary service market separately. Ideally, building operation should be planned in consideration of all viable markets to maximize the benefits to both building owners and the electric grid. Including both ancillary service revenues and energy cost within the optimization allows for determination of an operational strategy that balances the severity of grid needs with the desire for lower utility bills (or other objectives such as reduced energy consumption).

The development of an optimal multi-market scheduling methodology for commercial buildings presents some unique challenges not necessarily encountered by traditional generating plants or electric vehicles. First, a commercial building's primary responsibility is to provide a healthy and productive environment by maintaining occupant thermal, visual, and indoor air quality requirements. These constraints are likely experienced during the majority of hours a building would provide ancillary services, since HVAC system operation and the most attractive frequency regulation prices typically correspond with occupied periods. Second, in the absence of active storage systems (e.g. battery banks or ice storage), a building's primary demand response (DR) asset is its passive thermal mass. The charging and discharging of a "thermal mass battery", and its instant effect on overall building electric consumption, is affected by ambient weather conditions, occupant behavior, interactions with HVAC systems, and the unique physical character of a building's thermal properties. Third, HVAC system capacity limits and efficiencies are a function of ambient and operating conditions and ultimately impact the ability to simultaneously achieve or maintain zone conditions and provide frequency regulation. Additional intricacy is created by equipment sequencing and staging logic. If such interactions are not anticipated, the response to FR signals could be periodically constrained and may trigger equipment startup and shutdown. To accommodate such constraints and interactions, a whole-building model-based approach for estimating hourly commercial building regulating potential is proposed in the following description.

In a first embodiment, the invention presents an improved system and method for optimization of building energy usage in combination with deployment to an ancillary grid market, an example of which is frequency regulation. To facilitate understanding of the concepts and features of the invention, the discussion will first be presented in the context of a system comprising only two buildings, a medium office building with a packaged direct expansion (DX) variable air volume (VAV) cooling system, and a large office building with a chilled water VAV system, with additional building characteristics being as summarized in Table 1, although it will be appreciated that a typical system may involve a much larger number and variety of buildings. The present discussion will assume ambient weather conditions as shown in FIG. 1, although, again, this is by way of example only.

TABLE 1

Building Properties

| | Property | | |
|---|---|---|---|
| | Medium Office | Large Office | Units |
| Floors | 6 | 32 | # |
| Volume | 59,028 | 256,808 | $m^3$ |
| Conditioned Floor Area | 14,240 | 76,659 | $m^2$ |
| U-value (no film) | 0.334 | 0.339 | $W\,m^{-2}\,K^{-1}$ |
| Internal Thermal Capacitance | 3,788 | 19,043 | $MJ\,K^{-1}$ |
| Glazing Fraction | 40 | 53 | % |
| Glazing U-Factor | 3.104 | 3.240 | $W\,m^{-2}\,K^{-1}$ |
| Glazing SHGC | 0.306 | 0.498 | fraction |
| Lighting Power Density | 7.164 | 9.8 | $W\,m^{-2}$ |
| Equipment Power Density | 4.5 | 4.63 | $W\,m^{-2}$ |
| Occupant Density | 18.58 | 51.81 | $m^2\,person^{-1}$ |

A first step in a model predictive control (MPC) solution is the development of a building energy model for each building in the system, e.g., thermal zone and HVAC models for the two buildings. Thermal zone dynamics can be modeled using inverse gray-box resistance-capacitance (RC) networks as discussed, e.g., in "An Inverse Gray-Box Model for Transient Building Load Prediction," HVAC&R Research 8 (2002), pp. 73-100, and can be identified using output from detailed, multi-zone, EnergyPlus representations (See, e.g., U. DOE, EnergyPlus engineering reference, The Reference to EnergyPlus Calculations (2010)).

The thermal RC networks represent a system of first-order, linear, differential equations that can be converted to the transfer function form of Eq. (1)

$$\dot{Q}_{sh,t} = \sum_{k=0}^{n} S_k^T u_{t-k\Delta\tau} - \sum_{k=1}^{m} e_k \dot{Q}_{sh,t-k\Delta\tau} \qquad (1)$$

where S is a matrix containing input coefficients, ek is a vector containing heat gain history coefficients, n is the order of input history in the calculation, and m is the order of the heat gain history in the calculation. The input vector u is defined in Eq. (2), $$u^T = [T_z\ T_a\ T_g\ \dot{Q}_{sol,c}\ \dot{Q}_{sol,c}\ \dot{Q}_{g,r,c}\ \dot{Q}_{g,r,c}\ \dot{Q}_{sol,w}\ \dot{Q}_{,c}] \qquad (2)$$

where Tz is the zone air temperature setpoint, Ta is the ambient external air temperature, is Q̇sol,c is the external solar gains incident on the roof, Q̇sol,c is the solar radiation incident on exterior walls, Q̇g,r,c is the radiant portion of internal gains applied to the ceiling surface node, Q̇g,r,e is the radiant portion of internal gains applied to the wall surface node, Q̇sol,w is the solar radiation transmitted through glazing, and Q̇g,c is the total convective internal heat gain. Eq. (1) is used to compute the heat gain to the zone air node (Tz) in an overall energy balance on the zone air node shown in Eq. 3, $$C_z \frac{dT_z}{dt} = \dot{Q}_{sh,t} + \dot{Q}_{inf} + \dot{Q}_{zs,t} \qquad (3)$$

where Cz is the zone air node capacitance, Tz is the zone air temperature, Q̇sh,t is the zone sensible heat gain, Q̇inf represents infiltration heat gain, and Q̇inf is the sensible zone load.

Figure 2:
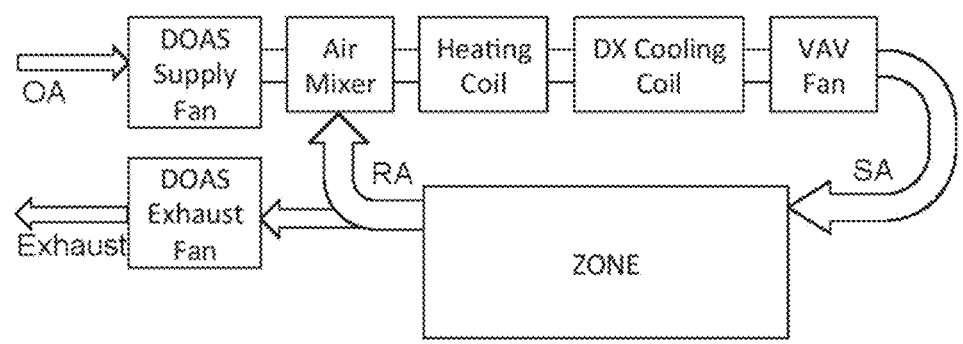
FIG. 2 is a block diagram of a VAV air handling unit with DX cooling coil, hot water heating coil and dedicated outdoor air system (DOAS)
Figure 3:
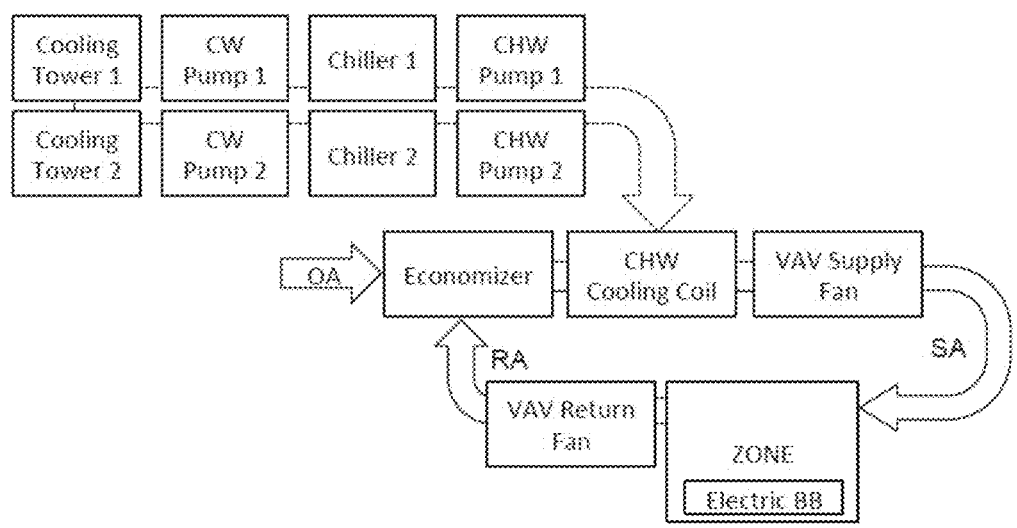
FIG. 3 is a block diagram of a chilled water (CHW) VAV system of an office building including chillers, cooling towers, water pumps, outdoor air economizer, and electric baseboard heating/reheat.

The packaged DX VAV system of the medium office building is outlined in FIG. 2, and shows a VAV air handling unit with DX cooling coil, hot water heating coil, and dedicated outdoor air system (DOAS). FIG. 3 highlights the chilled water (CHW) VAV system of the large office building including chillers, cooling towers, water pumps, outdoor air economizer, and electric baseboard heating/reheat. Equipment models can be based on the quasi steady-state physical formulations used by several mainstream whole building simulation programs, with equipment models to be simulated in sequence so the impact of each individual component impacts the others downstream.

An overall simulation scheme can be described by the following "predictor-corrector" approach: (1) perform an ideal load calculation using Eq. (3) to determine $\dot{Q}_{zs,t}$ that meets the zone temperature setpoint, (2) simulate the HVAC system using the ideal load ($\dot{Q}_{zs,t}$) as a requested system load, and (3) update zone temperature and load based on actual system performance and capabilities. This approach is repeated for each simulation time step allowing HVAC performance, control strategies, and capacity limits to affect zone conditions. To compute zone humidity, the simulation also includes a moisture balance as described in Eq. (4), $$m_{air}\frac{dW_Z}{dt} = \dot{m}_{inf}(W_{OA} - W_Z) + \dot{m}_{SA}(W_{SA} - W_z) + \frac{q_{occ,lat}}{h_{fg}} \quad (4)$$

where $\dot{m}_{air}$ is the mass of air in the zone, $\dot{m}_{inf}$ is the mass flow rate of air due to infiltration, $\dot{m}_{SA}$ is the supply air mass flow rate, $q_{occ,lat}$ is the occupant latent gain, and $h_{fg}$ is the heat of vaporization of water. $W_z$, $W_{OA}$ and $W_{SA}$ are the humidity ratios of the zone, outdoor air, and supply air, respectively.

In this first-described example of a system according to the invention the buildings participate in a frequency regulation market. To participate in frequency regulation markets it is necessary to quantify the continuous regulating capacity of a building during each bid period (often hourly). At a high-level, the problem is similar to that posed in the electric vehicle literature in that it is desired to determine the potential of a building to increase or decrease its power draw with respect to a particular baseline (i.e., expected operating point). However, due to the complexity and challenges previously described, a neat linear formulation is precluded. As with generating plants, buildings have a nonlinear baseline since HVAC system operation changes intra-hour and hour-to-hour in response to varying electric prices, weather, and equipment staging. Similarly, potential regulation capacity varies throughout the day as a function, for example, of weather and how much HVAC equipment is operating in response to the weather at any moment. As an example, the response available from air handling units depends on how many are operating in any given hour and at what part-load ratio. Consequently, it is proposed to use a model perturbation approach to determine the relationship between building power response and changes in control input.

Figure 4:
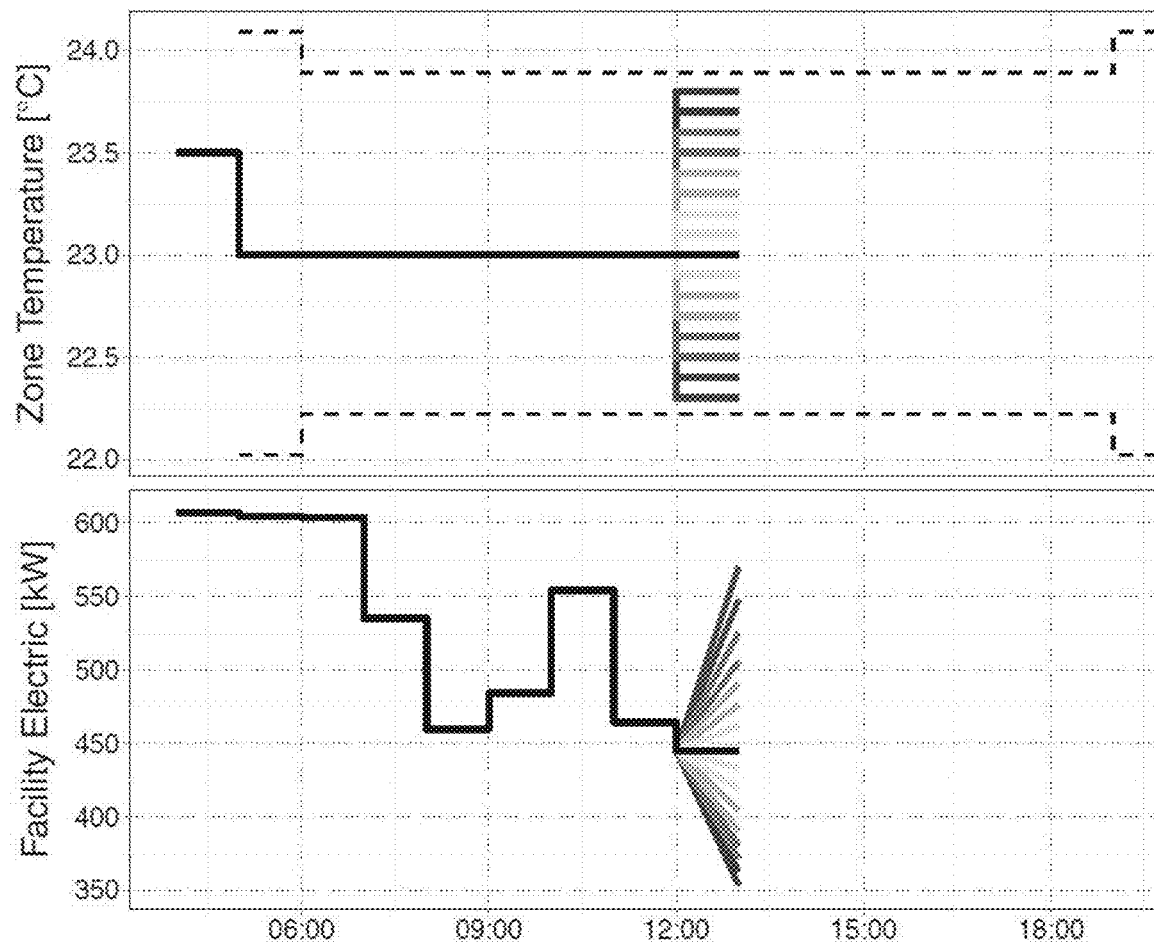
FIG. 4 depicts a correspondence between zone setpoint temperature perturbation and observed power response.

This concept is illustrated for FR via zone setpoint modulation in FIG. 4. In the example, the model is assumed to be tracking a baseline zone temperature setpoint of 23° C., and it is desired to determine the regulating capability for hour ending 1 PM. The model is used to evaluate the impact of zone setpoint changes from the baseline by simulating 0.1 K increments between a lower temperature limit of 22.2° C. (72° F.) and an upper limit of 23.9° C. (75° F.) as shown in the top window of FIG. 4. Simulation results are compared with the original baseline demand profile to determine expected changes in whole building power.

Figure 5:
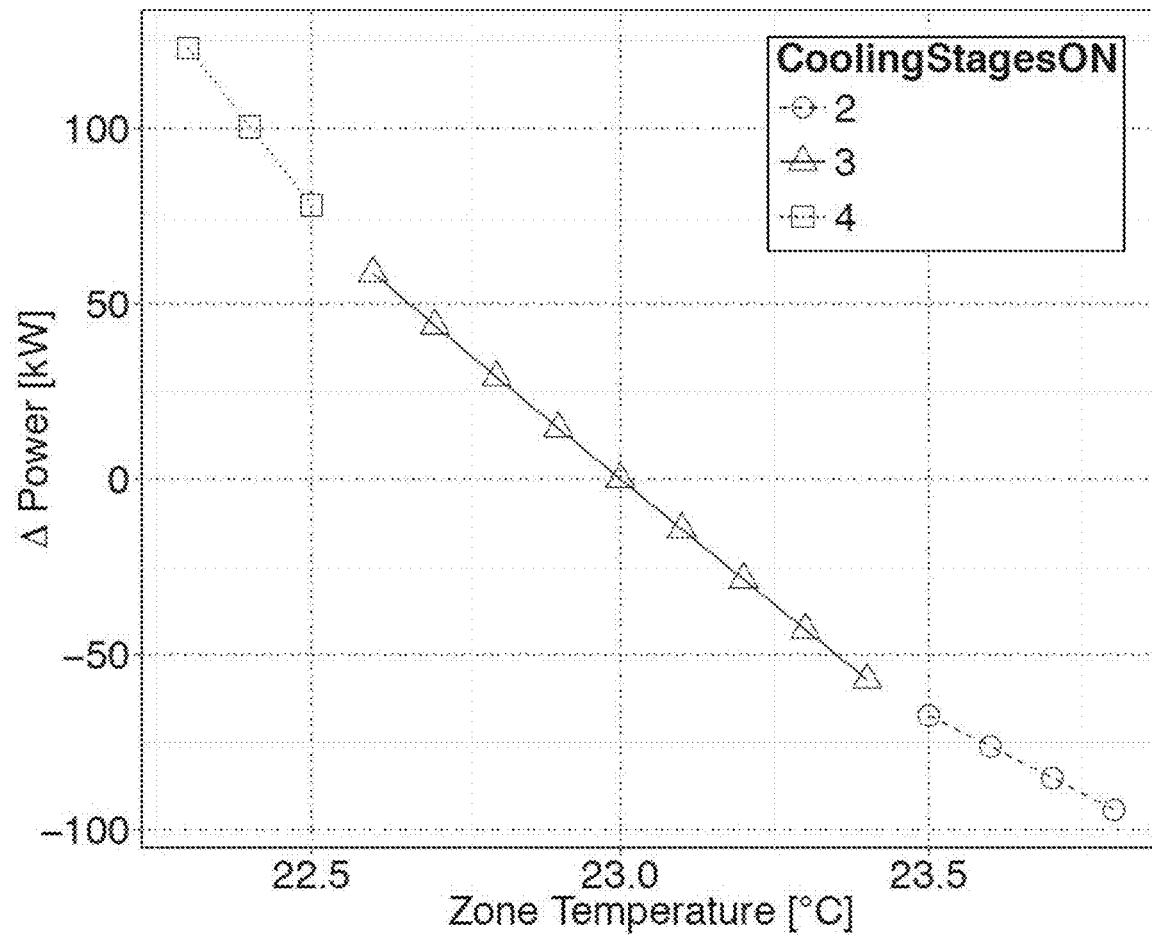
FIG. 5 depicts setpoint temperature power response grouped by active cooling stages.

An advantage of using more complex models is that the power response can be grouped based on other simulation output variables. Depending on the HVAC system in use, it may be undesirable to allow the frequency regulation signal to cause equipment cycling. In FIG. 5 the power response is grouped based on the number of active cooling stages, and shows that limiting the modulation to a range of 22.6-23.4° C. would prevent turning stages on or off.

Figure 6:
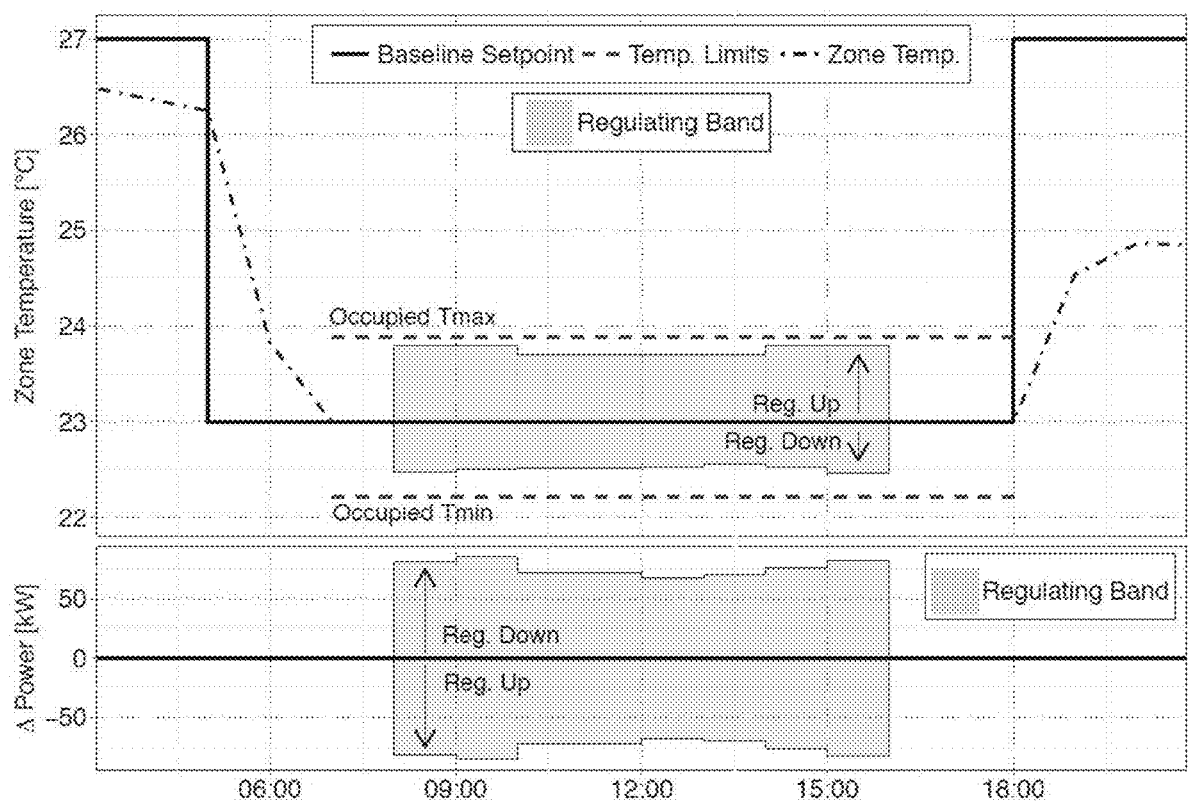
FIG. 6 illustrates an example of setpoint perturbation for each hour from 9 AM to 4 PM for explaining the operation of an embodiment of the invention.

The model perturbation analysis is repeated for each hour it is desired to determine the regulating capability. FIG. 6 provides an example of performing the FR estimation for a period from hour ending 9 AM to 4 PM, assuming a constant baseline of 23° C. The example highlights the fact that regulating potential may vary each hour depending on changes in HVAC equipment loading and efficiency.

The major assumption contained in this approach is that the effect of following the regulation signal, when integrated over each hour, does not cause significant deviation from the baseline setpoint strategy (i.e. the overall thermal strategy is maintained throughout the day). This assumption is ambitious when considering a single building, since the regulation signal is random and can spend extended time in either direction. However, in the future context of building aggregates, the assumption is more reasonable since the building aggregator may dispatch regulation duties over the course of all available hours in a manner that keeps each building near its preferred operating point and desired baseline strategy. Furthermore, the application of this work is intended more for the day-ahead planning and scheduling scenario. In buildings with large thermal inertia, load shifting strategies must often be planned and executed well in advance of peak or high priced hours. Estimating regulating capability and including in a day-ahead diurnal planning optimization allows buildings to be "prepared" for maximizing regulation, minimizing peak demand, maximizing economic demand response revenues, or an optimal blend of available opportunities.

According to this first embodiment of the invention, the operation of the buildings is optimized over multiple markets. A model predictive control (MPC) framework is effective for optimizing building operation in the presence of real-time (or day-ahead) energy prices, peak demand charges, and frequency regulation revenue. The overall objective can be described as:

$$\min J(\vec{x}) s.t.: \vec{x} \in [\vec{x}_{min}, \vec{x}_{max}]$$

where $\vec{x}$ is a control vector of setpoints in time, $\vec{x}_{min}$ is a vector of lower setpoint bounds, and $\vec{x}_{max}$ is a vector of upper setpoint bounds. The cost function $J(\vec{x})$ is defined by Eq. (5), $$J(\vec{x}) = E_{cost} + P_{demand} - R_{reg} \quad (5)$$

and includes terms for energy cost ($E_{cost}$), demand penalty ($P_{demand}$), and regulation revenue ($R_{reg}$). The cost of energy is computed by Eq. (6), $$E_{cost} = \sum_{t=1}^{t_{CH}} r_{DA}(t) E_{use}(t) \quad (6)$$

where $r_{DA}(t)$ is the day-ahead energy price for time interval t, $E_{use}(t)$ is the energy consumption over time interval t, and $t_{CH}$ represents the final time interval in the cost horizon. Peak demand limitations are enforced by setting a target demand limit (TDL) and penalizing demand excursions above this limit. By way of example, a linear demand penalty shown in Eq. (7) can be applied, $$P_{demand} = \max[M(\max(\text{ElecDemand}_{peak}) - \text{TDL}), 0] \quad (7)$$

where TDL is the target demand limit and M is the slope of the penalty function. ElecDemand$_{peak}$ is a vector containing the average power for each 60-min interval during the on-peak period. Demand charge calculations are ultimately utility specific, and may vary from this definition. Eq. (7) should be modified to reflect location specific rules.

Regulation revenue ($R_{reg}$) is computed by summing the product of the potential power change $\Delta_{power}$) and regulation price ($r_{reg}$) for all time intervals (t) in the cost horizon (Eq. (8)).

$$R_{reg} = \sum_{t=1}^{t_{CH}} \Delta_{power}(t) r_{reg}(t) \quad (8)$$

It should be noted that Eq. (8) is likely simplified from the actual calculation performed by regulation markets, and adjustments may be necessary based on ISO specific rules. In PJM, for example, a performance factor ranging from 0.25 to 1 is applied to scale the payment based on how well the regulation dispatch was followed. Additionally, a "mileage" multiplier is included to appropriately compensate resources for following faster, dynamic regulation signals and providing more overall movement during the hour. Therefore, Eq. (8) could be thought of as the result of assuming a performance factor and mileage multiplier of 1 under PJM rules.

This formulation considers the building as a "price taker," and assumes regulation prices are known in advance. Although perfect price forecasts were assumed herein, numerous methods could be considered for price forecasting.

FIG. 7 provides a graphical description of the multi-market optimization implementation. First, an initial baseline control vector $\vec{x}$ is generated by the optimizer. This initial control vector represents the baseline setpoint strategy or preferred operating point as discussed in Section 3.2. Second, the baseline strategy is simulated to determine the energy consumption and demand penalty for that candidate control vector ($\vec{x}$). Third, the FR estimation is performed using the model perturbation approach to determine the potential variation around the baseline (i.e. Δpower). Perturbed control vectors are denoted by the original baseline control vector $\vec{x}$ plus a setpoint change 6. The demand penalty ($P_{demand}$) from the baseline simulation is used in the FR estimation to ensure that the peak demand is not increased by providing regulation. Finally, the objective function of Eq. (5) is computed, returning the total cost of the strategy back to the optimizer.

In a simulation of the first embodiment, the multi-market optimization was first applied to a medium office building for low and high target demand limit (TDL) cases. The low TDL case creates the scenario of a potentially peak setting day, while the high TDL case simulates a scenario in which peak demand is less critical. The building was assumed to be available for regulation from 9 AM to 5 PM, using the zone temperature setpoint as the modulation variable. Temperature bands were limited to a range that produces symmetric power response (i.e., equal regulation up and down) to simulate participation in a combined regulation market (e.g. PJM) where resources are expected to respond similarly in both directions (see, e.g., C. Pilong, PJM Manual 12: Balancing Operations, Technical Report, PJM Interconnection, 2013)

FIG. 8 shows the results for a low TDL of 325 kW (i.e., demand limiting).

The night time setup (NSU) case represents typical building operation without optimization, while the OPT+FR case represents the result of the multi-market optimization process described above. In the OPT+FR case, the optimizer chose to start the HVAC system at hour ending 3 AM, precooling the zone to a temperature of 22.5° C. at hour ending 7 AM. The temperature is held near the middle and bottom of the occupied temperature range preceding the on-peak period to maintain stored thermal energy, and then stepped to the upper bound (Occupied Tmax) during the on-peak period to release thermal energy back into the zone. With the OPT+FR baseline zone setpoint strategy, regulation was available for 5 of 9 potential hours ranging from ±8 kW to ±60 kW.

Overall, the primary objective of this scenario was to reduce on-peak demand, since a significant $5.50 penalty is applied for each kW over the TDL. The cost function terms and energy use are summarized in Table 2, and show that expending an additional 364 kWh's during early hours results in negligible increase in energy cost and significant demand savings. The minimal impact of regulation in this scenario is also shown, contributing only $12 of revenue.

TABLE 2

Medium Office Low TDL Results

|  | NSU | OPT | OPT + FR |
| --- | --- | --- | --- |
| Energy Cost [$] | 246.51 | 247.65 | 250.93 |
| Energy Use [kWh] | 5,175 | 5,596 | 5,539 |
| Demand Penalty [$] | 320.27 | 103.66 | 103.99 |
| Reg. Revenue [$] | 0 | 0 | −11.87 |
| J ($\vec{x}$) [$] | 566.78 | 351.31 | 343.05 |
| % Diff | 0 | −38.02 | −39.47 |

The temperature and demand profiles of the OPT case (i.e. zone setpoint optimization without regulation) are also plotted for reference and show a similar strategy when regulation opportunities are excluded.

The results for the high TDL scenario are shown in FIG. 9. Looking at the OPT temperature and demand profiles shows an earlier start-up with slight precooling before 6 AM, followed by near NSU operation for the remaining hours. Table 3 shows that expending an extra 82 kWh's earlier in the day results in slight overall energy cost savings ($5.69) by reducing consumption during high-price hours. No regulation would be possible in the OPT case since the temperatures remain near the upper bound during hours available for regulation. In the OPT+FR case, the optimizer chose to follow the NSU strategy until hour ending 8 AM, after which the building is available to provide regulation. During regulation hours, the baseline zone setpoint was kept in the middle of the acceptable temperature range in order to create room for providing regulation. Keeping the zone setpoint 1 K lower during regulating hours uses 360 kWh's more than the NSU case, however the regulation revenue more than offsets the additional energy cost resulting in an overall savings of 15.7%. This additional energy expenditure to create flexibility in the zone temperature could be considered an opportunity cost of providing FR. On average, an estimated ±85 kW of regulation were available, with a maximum of ±100 kW available during hour ending 10 AM.

TABLE 3

Medium Office High TDL Results

|  | NSU | OPT | OPT + FR |
|---|---|---|---|
| Energy Cost [$] | 246.51 | 240.82 | 264.15 |
| Energy Use [kWh] | 5,175 | 5,257 | 5,534 |
| Demand Penalty [$] | 0 | 0 | 0 |
| Reg Revenue [$] | 0 | 0 | −56.39 |
| J ($\bar{x}$) [$] | 246.51 | 240.82 | 207.76 |
| % Diff | 0 | −2.31 | −15.72 |

The steady response of the large Office building was next explored, applying multi-market optimization to low TDL and high TDL cases for a large office building served by a chilled water VAV system. For these cases, the optimizer was given control over the zone temperature setpoint to take advantage of passive thermal mass, as well as the chilled water (CHW) temperature setpoint to alter chiller plant efficiencies and loading (i.e. the optimizer chooses both zone and CHW temperature setpoints). This building was assumed to be available to provide FR from 9 AM to 5 PM, using the CHW setpoint as the modulation variable. In this example, the chilled water supply is typically maintained at a constant 5.6° C. (42° F.). It was assumed that an operating range of 3.9° C. to 10.0° C. (39° F. to 50° F.) could be explored for FR without detrimental effects to equipment. Since increasing the chilled water temperature can result in the inability to maintain supply air temp (and consequently zone temperatures) a large penalty is added to solutions that result in degradation of zone conditions. A non-cycling condition was included in the FR estimation so that providing regulation does not turn chillers on or off. The requirement of symmetric regulation was also enforced.

The top panel of FIG. 10 shows that a zone precooling strategy is adopted that maintains the lower setpoint bound until the on-peak period. During the demand-limiting period the setpoint is raised to the upper bound to allow discharging of the thermal mass and reduction of on-peak demand and energy consumption during high-priced hours. The second panel from the top of FIG. 10 shows the chosen baseline chilled water temperature setpoints with regulating bands. Unlike the zone setpoint FR example, the CHW FR NSU case has a constant baseline between the temperature limits and is able to participate in regulation during 8 of 9 available hours. Regulation is not possible during hour ending 4 PM for the NSU case since the peak demand is set during this hour. The NSU regulation capability ranges from ±30 kW to ±70 kW with an average of ±50 kW, as shown in the third panel from the top of FIG. 10. The OPT+FR case is able to participate in the 2 h immediately preceding the on-peak period, with other hours unavailable due to the baseline CHW setpoint being at the upper or lower bound and the requirement to provide symmetric regulation. Overall, the solution is primarily seeking to reduce on-peak demand and the optimizer determines it is beneficial to forego several hours of regulation revenue to achieve these demand savings.

The results for the large office scenario with high TDL are shown in FIG. 11. The top panel shows that the OPT+FR case chose a slightly early startup and followed NSU operation during occupied hours. The OPT+FR CHW setpoint tended to stick near the upper bound with a few hours near the middle of the range during regulating hours. The early start-up and higher average CHW temperatures result in overall energy and cost savings, presumably due to economizing and more efficient loading and operation of the chiller plant. The OPT+FR case found it beneficial to participate in regulation for 5-9 h with an average capability of ±54 kW. The NSU results are similar to the low TDL case with the exception of hour ending 4 PM being available for FR since the demand limit is no longer a factor.

Overall, the estimated FR potential for this example was similar to the medium office building one-fifth the size, and an average regulating potential of ±50 kW seems somewhat unimpressive for an 8600 kW cooling plant with a rated power draw near 2 MW. To better understand these results and estimates, a further discussion on the modeling approach is helpful.

The modeling approach used herein makes use of a reduced-order thermal zone model and quasi steady-state HVAC models simulated at hourly time steps. The result is that hourly simulation output reflects the conditions reached by the end of the hourly time step. It is necessary to further consider the consequence of using such hourly output for FR estimation purposes.

In the context of FR via zone temperature setpoint modulation (e.g., medium office results discussed above), decreasing the zone cooling setpoint increases the zone cooling load and results in increased HVAC power. Comparing hourly outputs in this scenario result in FR estimates that include full HVAC system response due to changes in zone load, since system transients typically settle at timescales less than 1 h. In this case, FR estimates represent a maximum power change that is not necessarily instantaneously achievable at the two second FR timescale. In reality, some delay would be associated with the full HVAC system response and it may be necessary to apply a derate factor to adjust maximum estimates based on observed building response to regulation signals.

However, when estimating FR capability via CHW setpoint modulation (e.g. large office results discussed above), comparing the hourly simulation output may significantly underestimate the regulating potential. The difference, with respect to the zone setpoint case, is that changes in CHW setpoint ultimately do not affect the overall load placed on the cooling coil. It is expected that changes in CHW setpoint would initially excite a power response due to the transient loading or unloading of the chiller evaporator. This power response would then degrade as CHW return temperature is impacted and the temperature differential across the evaporator moves back toward steady-state conditions. In this scenario, using near steady-state hourly outputs to estimate FR would only reflect power changes due to differences in chiller and cooling coil performance, rather than evaporator load.

In order to estimate potential chiller response due to transient loading, the CHW FR estimation methodology was modified to use an isolated chiller model, rather than simulating the entire plant. The chiller model used according to this analysis has the functional form:

$$P_{chiller} = f(T_{chw,sp}, T_{chw,r}, \dot{m}_{chw}, T_{cdw,in}, \dot{m}_{cdw})$$

where $T_{chw,sp}$ is the CHW supply temperature setpoint, $T_{chw,r}$ is the CHW return temperature, $\dot{m}_{chw}$ is the CHW mass flow rate, $T_{cdw,in}$ is the condenser water inlet temperature, and $\dot{m}_{cdw}$ is the condenser water mass flow rate. Isolating the chiller model allows all flow rates and inlet temperatures to be held constant while changing the CHW setpoint. This results in estimates that include changes in chiller performance as well as overall evaporator load.

The estimates produced from this method may be closer to the maximum regulating potential. Herein, the FR estimation using the isolated chiller model is referred to as the "fast response" method, and the large office FR estimation using the whole building hourly results is referred to as the "steady response" method.

Results for the large office low TDL multi-market optimization using the fast response FR estimation method are shown in FIG. 12. Overall, the results are similar to the steady response method with the exception that regulation estimates are much higher. On average, the fast response method estimated ±450 kW of regulation compared to ±50 kW by the steady response method for the OPT+FR case. Although the NSU+FR operation could have generated over $200 of revenue for the day, greater priority is still given to demand reduction due to the steep penalty. Energy use and cost function terms for the large office low TDL cases are summarized in Table 4.

experienced during occupied hours in any of the large office results was 9.6 g/kg, with an average of 8.5 g/kg.

Overall, the methodology presented is effective for estimating commercial building regulating potential, since detailed interactions and constraints are captured through the use of whole-building energy models. The MPC framework, considering both cost and revenue, appropriately determined opportunities when buildings could participate in FR. The optimizer was able to increase the potential regulation capability by moving buildings away from setpoint and system capacity limits to a more flexible state. Additionally, the modeling process identified that compensating effects may be encountered, when injecting the signal at lower system levels, that can limit the magnitude and duration of FR response.

From a practical perspective, the model perturbation approach results in potentially hundreds of additional simulations for each MPC function evaluation. Perturbations are independent, however, and may take advantage of parallel computing resources to reduce run times. Optimizations

TABLE 4

Large Office Low TDL Results

|  | | Steady Response Method | | Fast Response Method | |
| --- | --- | --- | --- | --- | --- |
| NSU | OPT | NSU + FR | OPT + FR | NSU + FR | OPT + FR |
| Energy Cost [$] | 2061.36 | 2070.83 | 2061.36 | 2031.82 | 2061.36 | 2063.54 |
| Energy Use [kWh] | 42,861 | 51,908 | 42,861 | 51,025 | 42,861 | 51,548 |
| Demand Penalty [$] | 5573.92 | 1585.69 | 5573.92 | 1285.99 | 5573.92 | 1652.02 |
| Reg Revenue [$] | 0 | 0 | −31.36 | −6.45 | −205.41 | −58.58 |
| J ($\vec{x}$) [$] | 7635.28 | 3656.53 | 7603.92 | 3311.35 | 7429.87 | 3656.99 |
| % Diff | 0 | −52.11 | −0.41 | −56.63 | −2.69 | −52.10 |

In FIG. 13, the high TDL optimization results using the fast response method show similar OPT and OPT+FR solutions for the zone temperature setpoint when compared to the previous results in FIG. 11. Comparing the CHW setpoints shows that when using the fast response method the CHW temperature was kept near the middle of the temperature range in order to provide more regulation. Since the fast response method estimates greater regulating potential, the revenue generated is greater than any savings generated from keeping a higher CHW temperature. The OPT+FR was able to provide regulation during 8 of 9 h, with a maximum capability of ±1 MW at 3 PM. On average, the available capability was ±610 kW, generating nearly $465 in revenue for the day. The energy use and cost function terms for the high TDL cases are summarized in Table 5.

described above required approximately 1-6 h of compute time on a twelve-core machine, and depending on ISO operational timelines this method seems possible for day-ahead planning. Further work is needed to validate the methodology compared to actual building performance. Such validation may require high resolution metering that conforms to ISO protocols for FR participation.

According to a second embodiment of the invention, the system focuses again on multi-objective optimization of building energy usage, looking for a synergistic effect of combined control of multiple buildings. For purposes of discussion of this second embodiment, it is assumed that the buildings can be of three different types, i.e., a stand-alone retail building, medium office building, and large office building. Building energy models are created for each build-

TABLE 5

Large Office High TDL Results

|  | | Steady Response Method | | Fast Response Method | |
| --- | --- | --- | --- | --- | --- |
| NSU | OPT | NSU + FR | OPT + FR | NSU + FR | OPT + FR |
| Energy Cost [$] | 2061.36 | 1836.78 | 2061.36 | 1855.31 | 2061.36 | 2023.74 |
| Energy Use [kWh] | 42,861 | 43,474 | 42,861 | 40,829 | 42.861 | 43,944 |
| Demand Penalty [$] | 0 | 0 | 0 | 0 | 0 | 0 |
| Reg Revenue [$] | 0 | 0 | −34.30 | −27.51 | −333.51 | −463.73 |
| J ($\vec{x}$) [$] | 2061.36 | 1836.78 | 2027.06 | 1827.80 | 1727.85 | 1560.01 |
| % Diff | 0 | −10.89 | −1.66 | −11.33 | −16.18 | −24.32 |

It is further noted that although several scenarios resulted in higher average CHW temperatures, zone humidity levels remained reasonable. The maximum zone humidity ratio ing type, for use in exploring various portfolio (i.e. multi-building) optimization scenarios. Selected building characteristics are summarized in Table 6. The thermal zone models were based on inverse gray-box RC (resistance-capacitance) networks, and were identified from detailed EnergyPlus counterparts. Given known heat sources (e.g. solar radiation, lighting, and occupants) and boundary conditions (e.g. ambient temperatures and zone setpoints), the thermal RC networks can be used to compute the total heat flow $\dot{Q}_{sh,t}$ to (or from) the zone air node (i.e. zone sensible heat gain). An energy balance can be formulated for the zone air, using Equation (3) above. HVAC component models were based on algorithms presented in the EnergyPlus Engineering Reference Manual, as well as the ASHRAE HVAC Toolkit 2. Component models were programmed such that a full air loop can be simulated, allowing system air states to be included in a zone moisture balance for computing zone humidity levels.

In the simulation scheme, Equation (3) is used to compute the sensible zone conditioning ($\dot{Q}_{zs,t}$) that must occur in order to meet the desired zone temperature setpoint. The required sensible load $\dot{Q}_{zs,t}$ is then used to simulate the HVAC system models, and the zone temperature is updated to account for HVAC system availability and capability. This procedure is repeated for each simulation time step allowing the zone conditions to be impacted by HVAC performance, control strategies, and capacity constraints.

observe the resulting power response. For a single building, the regulation revenue ($R_{reg}$) was computed by summing the product of the potential power change ($\Delta_{power}$) and regulation price ($r_{reg}$) for all time intervals (t) in the cost horizon as shown in Equation (8).

In this work, a constraint was applied to limit building FR response to a symmetric region around the baseline power draw in order to simulate a combined regulation market where resources are expected to respond similarly to both power increase and decrease request In pursuit of exploring the existence of synergy through optimal control of building portfolios, the single building MPC (model predictive control) environment originally developed by Corbin et al., "A model predictive control optimization environment for real-time commercial building application," Journal of Building Performance Simulation 6 (2013) 159-174, was extended to accommodate multiple buildings. The MPC environment couples building energy simulation with optimization routines in order to explore building operational strategies that minimize the desired cost function (e.g. energy, cost, and demand charge). MPC provides a framework for considering the current state of the building in conjunction with future predictions of variables of interest (e.g. weather and energy price). The determined

TABLE 1

Building properties for retail, medium office, and large office energy models.

| | | Property | | |
|---|---|---|---|---|
| | Retail | Medium Office | Large Office | Units |
| Vintage | 1980 | 2001 | 1980 | year |
| Floors | 1 | 6 | 32 | # |
| Volume | 13 984 | 59 028 | 256 808 | m$^3$ |
| Conditioned Floor Area | 2294 | 14 240 | 76 659 | m$^2$ |
| U-value (no film) | 0.418 | 0.334 | 0.339 | W m$^{-2}$ K$^{-1}$ |
| Internal Thermal Capacitance | 450 | 3788 | 19 043 | MJ K$^{-1}$ |
| Internal Thermal Cap. per Floor area | 196.2 | 266.0 | 248.4 | kJ K$^{-1}$ m$^{-2}$ |
| Infiltration | 1.01 | 0.13 | 0.17 | ACH |
| Glazing Fraction | 7 | 40 | 53 | % |
| Glazing U-Factor | 3.354 | 3.104 | 3.24 | W m$^{-2}$ K$^{-1}$ |
| Glazing SHGC | 0.385 | 0.306 | 0.498 | fraction |
| Lighting Power Density | 32.3 | 7.164 | 9.8 | W m$^{-2}$ |
| Equipment Power Density | 5.23 | 4.5 | 4.63 | W m$^{-2}$ |
| Occupant Density | 7.11 | 18.58 | 51.81 | m$^2$/person |
| HVAC System | DX-CV | DX-VAV | CHW-VAV | — |
| Chiller Rated Power | — | — | 1960 | kW |
| Chiller COP | — | — | 4.4 | — |
| CHW Pump Power | — | — | 150 | kW |
| CW Pump Power | — | — | 150 | kW |
| Cooling Tower Power | — | — | 180 | kW |
| AHU Rated Fan Power | 18 | 200 | 815 | kW |
| DX Rated Power | 100 | 430 | — | kW |
| DX COP | 3.2 | 3.0 | — | — |
| DOAS Rated Fan Power | — | 14.4 | — | kW |

In order to consider potential ancillary service revenues in the optimizations, it was necessary to estimate the quantity of service that can be provided by each building. To appropriately accommodate comfort constraints, system capacity limitations, and complex building-occupant-ambient interactions, the whole-building model-based approach for estimating hourly commercial building regulating potential developed by the present inventors (see, G. S. Pavlak, G. P. Henze, V. J. Cushing, "Optimizing commercial building participation in energy and ancillary service markets," Energy and Buildings 81 (2014) 115-126) was utilized. In this approach, building energy models are used to explore setpoint changes from the current operating point and optimal strategy may be executed in part or entirety, and the MPC controller steps forward through time in a continuous manner.

Optimizing a portfolio of N buildings can be considered a generalization of the single building problem, and involves managing initialization, optimization, and execution tasks across multiple buildings. The first phase of the model predictive controller performs an initialization of the simulation and optimization parameters. The generalization to multiple buildings was created through repetition of lower level tasks for all buildings. This process of loading and initializing multiple building models for optimization is illustrated through the for loop pseudocode shown in FIG. 14.

The first task (pseudocode line 4) involves loading building specific parameters (i.e. localParams) to update high-level defaults (i.e. globalParams). Parameters specifying optimization convergence tolerances and iteration limits, for example, can be considered global and need not be uniquely defined for each building. It was also assumed in this work that all optimized buildings follow the same MPC horizon structure, having equal length planning and execution windows. In order to consider a wide variety of cases, it was necessary to allow optimization variables, discretization, and variable bound constraints to be uniquely defined for each building. Additional examples of building-specific parameters are the simulation engine, comfort penalty, and availability to provide frequency regulation.

In the second task (pseudocode line 5), weather forecasts and history are loaded for each building. Weather has been considered building-specific in order to provide a more generalized framework. When optimizing a portfolio of co-located buildings it seems likely that weather forecasts would vary minimally between buildings. However, measured historical data may be available if buildings are equipped with weather stations, which would capture local variations between buildings. Historical weather data is important for establishing an accurate thermal history within the model, keeping the model as near to reality as possible. Although not considered in this work, it may also be desired to optimize dispersed buildings which experience entirely different weather patterns as well.

In conjunction with weather, utility data is loaded for each building in the third task (pseudocode line 6). Since the buildings operate independently, and cannot share thermal energy, their energy consumption is independent. Thus, energy expense can be computed using different energy price structures for each building within the portfolio optimization. Ancillary service prices are often established for an entire balancing area or region and may not be unique for co-located buildings. However, such prices could also be defined uniquely for each building as well.

The final tasks of initialization (pseudocode lines 7 and 8) involve loading building energy model descriptions specific to the desired simulation engine, and pre-establishing model thermal history if appropriate. The reduced order models used in this work allow building thermal states to be prescribed and propagated through optimization iterations, which allows the building "warm up" to be performed only once during initialization. However, when using EnergyPlus as the simulation engine the thermal history must be re-established at each simulator call. Further information regarding establishment of thermal history within Energy-Plus is described by Corbin et al., cited above. The initialization phase produces an organized container of data and parameters for each building to be used and modified throughout the MPC operation. In FIG. 15, this is represented by the black rectangles labeled "Bldg 1," "Bldg 2," and "Bldg N."

The MPC optimization was performed using a variant of the metaheuristic particle swarm (PSO) algorithm, as implemented by Corbin et al., cited above. This algorithm accommodates binary and discretized continuous variables with box and equation constraints. The variable number of particles can be split into separate neighborhoods that allow independent exploration of the decision space. A taboo list is also included to prevent multiple evaluations of the same control vector. At a high level, the algorithm generates a candidate control vector ($\vec{x}$) and expects the cost of that control strategy to be returned as an input. The overall portfolio optimization scheme is highlighted in FIG. 15.

The control vector x generated by the optimizer contains the decision variables for all buildings in the portfolio. This is denoted [$\vec{x}_{B1,S1}, \ldots, \vec{x}_{BN,Sj}$], where subscript B1,S1 represents the first control schedule for building one, and BN,Sj represents the j-th control schedule for building N. As shown in FIG. 15, this initial control vector must first be split into separate decision vectors for each building and populated into the corresponding model. Each building may desire to optimize a different number of schedules which is denoted through the use of separate schedule indices h, i, and j in the figure. After decision variables are divided among buildings, the building model and parameters are passed to the simulation engine(s) to evaluate the control vectors. The environment currently only allows for a combination of reduced order and EnergyPlus models to be used within the same portfolio optimization, however, similar extensions could be made to include other building simulators as well.

For a particular building it may also be desired to include the estimation of the FR (frequency regulation) potential, as denoted in FIG. 15 by the dashed "FR" rectangles. Simulation results are then passed to the objective function for use in computing the total cost of the control vector. The simulation outputs for Bldg 1 and Bldg 2 are in bold since they are a function of both the initial control vector x and setpoint changes δ used to estimate FR capability. These results contain a set of separate simulation outputs for each value of δ, which is necessary for determining the optimal amount of FR. The objective function can also be computed with the inclusion of building multipliers to allow numerous portfolio combinations to be evaluated without increasing the optimization complexity.

Within the objective function, the portfolio energy cost is computed by summing the individual energy expense of all buildings as shown in Equation (9), $$E_{cost} = \sum_{n=1}^{N} \sum_{t=1}^{t_{CH}} r_{DA,n}(t) E_{use,n}(t) \tag{9}$$

where $r_{DA,n}(t)$ is the day-ahead energy price at time t for the n-th building, $E_{use,n}(t)$ is the energy consumption over time interval t for the n-th building, and $t_{CH}$ represents the final time interval in the cost horizon.

Although rate structures often incorporate peak demand charges that are significantly greater than the value of providing frequency regulation ancillary service, an economic tradeoff conceivably exists where higher demand penalties can be offset by greater opportunities for revenue generation. In order to create a broad framework that can appropriately weigh the economic value of regulation service and demand penalties under any given price scenario, it is necessary to determine the optimal quantity of frequency regulation for each building considering the cost of portfolio peak demand excursions.

This was accomplished in this work by computing the demand penalty ($P_{demand}$) and regulation revenue ($R_{reg}$) for all combinations of FR perturbations. Performing the FR perturbation analysis for each individual building results in a separate set of output variables for each perturbation δ. The combinations of single building electric demand profiles for all buildings and all perturbations can be enumerated exhaustively to create a matrix containing the aggregate portfolio demand profiles for all potential FR scenarios, shown in Equation (10). The columns of the matrix represent simulation time steps from 1 to t, while each row is a realization of a perturbation combination. The example matrix shown is for two buildings where $\delta_{21}$ signifies the building 2 control vector with perturbation 1, and indices f and g represent the final perturbations for building 1 and building 2, respectively.

$$ElecDemand = \begin{bmatrix} D(1, \delta_{11}, \delta_{21}) & D(2, \delta_{11}, \delta_{21}) & \dots & D(t, \delta_{11}\delta_{21}) \\ D(1, \delta_{11}, \delta_{21}) & D(2, \delta_{11}, \delta_{21}) & \dots & D(t, \delta_{11}\delta_{22}) \\ \vdots & \vdots & \ddots & \vdots \\ D(1, \delta_{1f}, \delta_{2g}) & D(2, \delta_{1f}, \delta_{2g}) & \dots & D(t, \delta_{1f}, \delta_{2g}) \end{bmatrix} \quad (10)$$

Demand penalties can be computed for all portfolio demand profiles as in Equation (11), $$P_{demand} = \text{MAX}[M(\text{MAX}(ElecDemand(:,t_{peak})) - TDL_p), 0(:,1)] \quad (11)$$

where $t_{peak}$ represents a time index spanning all on-peak hours, $TDL_p$ represents the portfolio target demand limit, M represents the slope of the demand penalty in units of $/kW, and 0(:,1) represents a column vector of zeros. Small capital letters are used in the "MAX" function to denote a matrix function that operates on each row. Equation (11) results in a column vector of demand penalties ($P_{demand}$) for all portfolio demand profiles.

Matrix operations can similarly be used in computing the regulation revenue for each combination of perturbations. The baseline portfolio demand (i.e. without perturbation) can be subtracted from the absolute demand profiles to determine the power change available for regulation, denoted as $\Delta ElecDemand$. The regulation revenue ($R_{reg}$) can then be computed by $$R_{reg} = \text{SUM}(\Delta ElecDemand \circ r_{reg}) \quad (12)$$

where $r_{reg}$ represents a matrix of regulation prices with size equal to $\Delta ElecDemand$, and SUM represents a sum over matrix rows. The "$\square$" operator is used to denote element wise matrix multiplication. The overall objective of Equation (12) is to compute the regulation revenue for all perturbation combinations listed in Equation (10). The demand penalty vector and regulation revenue vector can then be added to determine the combination that leads to the lowest cost. The overall cost of the control vector $J(\vec{x})$ is computed by adding the energy cost, demand penalty, and regulation revenue as in Equation (5) above.

The optimization continues until an exit criterion is met, at which point the optimal results for each building are passed along to the execution and reporting phase. During the execution and reporting phase, the optimal solutions for each building are written to various output files. The optimal solution is executed in the simulation environment and the resultant thermal state trajectory is appended to the building model history. This work was performed entirely within a simulation testbed, thus the solutions were essentially executed by implementing them in the same model used for optimization (i.e. no model mismatch). The MPC horizons are then incremented in time to begin optimizing a new planning horizon with the updated building models.

The simulation case studies described below were performed under the weather and pricing shown in FIG. 16. For the large office building, the optimizer was given control over zone temperature and chilled water supply temperature setpoints. For the medium office and retail building, the optimizer was allowed to manipulate zone temperature setpoints only. Since the assumption was made that no electrical generation equipment was present at the building sites, the buildings are always net consumers of energy and power flow is one directional.

As a first case study, a portfolio was constructed consisting of 120 retail buildings and a single large office building. This ratio was chosen so that the building types under control in the optimization have equal ability to reduce demand (i.e., 120 retail buildings can shed approximately the same amount of load as one large office building). Essentially two zone temperature control strategies are being juxtaposed: typical scheduled night time setup (NSU), and the optimized strategy determined via MPC (OPT). FIG. 17 illustrates the targeted portfolio demand in relation to the absolute minimum achievable demand and peak demand when operating all buildings in the portfolio under a typical night time setback control strategy (NSU). "R" and "L" are used to denote retail and large office buildings, respectively. As a whole, the portfolio is seeking to shed 808 kW of peak demand.

In order to illuminate the possible existence of synergistic effect, the portfolio optimizations were compared to the aggregation of individually optimized portfolio members. Optimizing portfolio members individually requires dividing the portfolio TDL into separate demand limits for each building (or type) under control. There are an infinite number of ways to achieve this task, however, three scenarios were selected for evaluation in this work, as shown in FIG. 17 and Table 7.

TABLE 2

Individual and portfolio TDLs for Portfolio 1 optimizations.

| Scenario | Target Demand Limit | | | |
|---|---|---|---|---|
| | Rs | Ls | (RL)p | Units |
| a | 16 419 | 3013 | 19 432 | kW |
| b | 16 826 | 2606 | 19 432 | kW |
| c | 17 227 | 2205 | 19 432 | kW |

All three scenarios lead to the same portfolio optimization, however, the outcome of the differing individual optimizations ends up having significant implications on whether synergistic effect is observed. A lower case "s" and "p" are also used to denote single optimization results and portfolio optimization results, respectively, Scenario "a" represents the situation where the desired portfolio demand reduction is entirely attributable to the peak reduction needs of the retail building. This scenario could occur when the buildings set their monthly peak demand on different days during the month. It seems possible that this could occur if the buildings are conditioned differently throughout the month, such as during weekends or holidays. To simulate this scenario the retail building target demand limit was set at 16,419 kW, requiring a load reduction of 808 kW to avoid incurring a demand penalty. The target demand limit for the individual large office optimization was set at 3,013 kW, which is nearly equivalent to the NSU peak, resulting in no demand penalty for NSU operation. The large office was assumed to be available to provide FR from 9:00 AM to 5:00 PM. The retail building was defined as having no ability to perform frequency regulation through changes in HVAC operation since the RTU fan and DX coil are single speed and unable to modulate smoothly while following regulation dispatch.

The retail building optimization results for scenario "a" are highlighted in FIG. 18, with the "on-peak" period extending from hour ending 1:00 PM to hour ending 4:00 PM. To achieve the desired demand reduction, the OPT Rs case chose an early startup with significant precooling. This resulted in the consumption of 56.3 (28%) more energy and $1315 (12%) more energy expense than the NSU Rs case, with the reward of avoiding more expensive demand penalties. However, when the portfolio perspective was considered in the OPT Rp case, the optimizer chose the NSU strategy, performing no load shifting through the retail buildings.

The large office building results for scenario "a" are shown in FIG. 19. The NSU Ls case was able to perform $206 in regulation services through modulation of the chilled water setpoint, while the portfolio NSU case (NSU Lp) was able to perform $273 in regulation revenue. During on-peak hours, the regulation capability was often constrained by the target demand limit, since the requirement for symmetric regulation was enforced. In the presence of steep demand penalties, the FR estimation essentially attempts to provide FR up to the TDL. Since the retail building does not provide FR or operate at its peak demand for the entire on-peak period, additional space was available while adhering to the same demand limit. When the portfolio perspective was considered, the large office building was able to utilize the additional space beneath the TDL during hours when the retail building was below its peak to generate an additional $67 of regulation revenue for the NSU Lp case (i.e. 33% more than the NSU Ls case).

The OPT Ls case started cooling the building five hours before the NSU Ls case and kept temperatures near the middle of the occupied temperature range, to reduce energy use during high-priced afternoon hours. The precooling was incentivized purely by energy price arbitrage opportunities (i.e. shifting energy use to lower priced hours), and also resulted in "voluntary" peak demand reductions since the higher energy prices tended to be coincident with the peak period. The OPT Ls case was able to generate $418 in total regulation revenue, and reduce energy cost by $134, at the expense of consuming 1761 kWh more than the NSU Ls case. In the OPT Lp case, the optimizer chose to keep the zone temperatures slightly lower during the hours preceding the peak period in order to achieve greater demand reductions and meet the portfolio TDL. Although the entire 808 kW demand reduction was performed by the large office building it was still able to achieve $337 of regulation revenue.

Further analysis of the portfolio-level results provides insight into the benefit created by using the large office building to perform all of the load reduction. FIG. 20 highlights the portfolio energy consumption, optimizer cost $J(\vec{x})$, and the percent savings for each optimization case. Rs+Ls represents the combination of individually optimized retail and large office buildings, while (RL)p denotes results from the portfolio optimization. Percent savings are reported with respect to a Rs+Ls NSU reference case that excludes frequency regulation opportunities.

First, it is noted that the NSU Rs+Ls case is equivalent to the NSU (RL)p case. This implies that no natural diversity exists through simple aggregation of the retail and large office buildings under NSU operation, since both peak during hour ending 4:00 PM. Although the NSU cases were able to generate regulation revenue, the savings are relatively small at 1.2%-1.6%. This is mostly due to the large proportion of retail buildings in the portfolio that contribute significantly to the energy cost and demand penalty terms in the cost function, but are unable to participate in regulation.

Second, the top panel shows that providing the 808 kW demand reduction using the retail building (OPT Rs+Ls) expends 54.2 MWh more than when all shifting is performed by the large office building ((RL)p). This extra energy consumption translates into $1243 in additional energy expense. The bottom panel shows that the OPT (RL)p case was able to eliminate the demand penalty at lower energy cost than the OPT Rs+Ls case. In the portfolio optimization the optimizer can see that the large office building can make significant demand reductions in response to energy price alone, and determined that the large office could take on the remaining demand reductions at lower cost than the retail buildings. Overall, the portfolio optimization increased the percent savings by 7.3 percentage points compared to the aggregated individual optimizations. Detailed cost function values are highlighted in Table 8 for further reference.

TABLE 3

Case 1a aggregated individual and portfolio optimization results with FR.

|  | Rs + Ls | | (RL)p | |
| --- | --- | --- | --- | --- |
|  | NSU | OPT | NSU | OPT |
| Reg. Revenue [$] | 206.14 | 418.12 | 273.30 | 337.44 |
| Energy Cost [$] | 12 597 | 13 778 | 12 597 | 12 535 |
| Energy Use [kWh] | 241 146 | 299 260 | 241 146 | 245 002 |
| Demand Penalty [$] | 4447.19 | 78.61 | 4447.16 | 0 |
| J ($\vec{x}$) [$] | 16 838 | 13 439 | 16 771 | 12 197 |
| % Difference | −1.21% | −21.15% | −1.60% | −28.44% |

Scenario "b" represents the situation where individually the large office and retail building contribute equally to the desired portfolio demand reduction (i.e. 404 kW each). It is conceivable that this scenario may arise when both buildings are attempting to operate under previously set peak demands, and must shed similar amounts of load to avoid setting a new peak. This scenario was simulated by setting the Rs target demand at 16,826 kW and the Ls target demand at 2,606 kW. The portfolio TDL remains at 19,432 kW thus portfolio optimization solutions are identical to scenario The scenario "b" retail building results are shown in FIG. 21. The OPT Rs case started conditioning two hours before typical NSU operation and cools to the lower setpoint boundary of 20° C. immediately preceding the on-peak period to achieve the 404 kW peak load reduction. The precooling is less extreme than in scenario "a," as expected for the higher TDL. The load shifting consumes 15.4 MWh more than the NSU case, resulting in $485 of additional energy expense. As previously observed, the OPT Rp solution follows the NSU setpoint strategy.

The large office results for scenario "b" are highlighted in FIG. 22. As previously observed, the NSU Ls case is able to generate $206 of regulation revenue, while the NSU Lp case is able to generate $273 due to the additional space and diversity created through aggregation. When optimized individually (OPT Ls), the large office building precools and maintains a zone temperature near 22.5° C. preceding the on-peak period. The stored thermal energy is then discharged during the peak period to achieve the necessary 404 kW demand reduction. A closer look at the demand profiles reveals the optimizer chose to shed 651 kW of peak demand in order to create more space for providing frequency regulation. The OPT Ls case was able to generate $384 of regulation revenue while meeting the 2606 kW TDL, nearly doubling the revenue generated in the NSU Ls case. The increased precooling requires consuming 2.7 MWh more energy, costing an additional $119. In the portfolio optimization (OPT Lp), the large office takes on the responsibility of the entire 808 kW demand reduction which results in increased energy consumption and reduced regulation revenue when compared to the OPT Ls case.

FIG. 23 summarizes the aggregate results for scenario "b." By performing all load shifting via the large office building, the (RL)p OPT case is able to reduce energy consumption by 14.3 MWh (5.5%) and energy expense by $428 (3.3%) over the individually optimized case (OPT Rs+Ls), resulting in a 2.2 percentage point increase in total percent savings. Cost function numbers for the aggregated individual and portfolio optimizations are provided in Table 9.

TABLE 4

Case 1b aggregated individual and portfolio optimization results with FR.

| | Rs + Ls | | (RL)p | |
|---|---|---|---|---|
| | NSU | OPT | NSU | OPT |
| Reg. Revenue [$] | 206.14 | 383.66 | 273.30 | 337.44 |
| Energy Cost [$] | 12 597 | 12 963 | 12 597 | 12 535 |
| Energy Use [kWh] | 241 146 | 259 266 | 241 146 | 245 002 |
| Demand Penalty [$] | 4447.19 | 0 | 4447.16 | 0 |
| $J(\vec{x})$ [$] | 16 838 | 12 579 | 16 771 | 12 197 |
| % Difference | −1.21% | −26.20% | −1.60% | −28.44% |

Scenario "c" represents the situation where individually the large office desires to reduce demand by 808 kW, while the retail building has no need to reduce load. This scenario might also arise if the building set their monthly peak on separate days as in scenario "a." This scenario was simulated by setting the large office TDL at 2205 kW and the retail TDL at 17227 kW. The portfolio TDL remains at 19432 kW thus portfolio optimization results are identical to scenarios "a" and "b".

Scenario "c" results for the retail building including regulation are shown in FIG. 24. Due to the high TDL, the NSU Rs case incurs no demand penalty, and is only incentivized by real-time energy prices to shift consumption. The optimizer determined that no beneficial opportunities for energy arbitrage existed and that NSU operation was optimal. As previously observed, the portfolio results determined load shifting using the retail buildings was not effective and NSU operation was chosen as well.

The large office building results for scenario "c" are shown in FIG. 25, and exhibit a significant precooling strategy. The NSU Lp case was once again able to generate $67 more regulation revenue than the NSU Ls case due to the retail building not performing regulation and operating below the TDL during several on-peak hours. Considering the OPT cases, the portfolio optimization (OPT Lp) was able to achieve the desired demand reduction while consuming 3 MWh less energy and providing $86 more in regulation revenue.

The portfolio results for scenario "c" are summarized in FIG. 26 and show that a minor savings increase of 0.6 percentage points was observed when buildings were optimized as a portfolio. The cost function numbers are also presented in Table 10.

TABLE 5

Case 1c aggregated individual and portfolio optimization results with FR.

| | Rs + Ls | | (RL)p | |
|---|---|---|---|---|
| | NSU | OPT | NSU | OPT |
| Reg. Revenue [$] | 206.14 | 251.16 | 273.30 | 337.44 |
| Energy Cost [$] | 12 597 | 12 542 | 12 597 | 12 535 |
| Energy Use [kWh] | 241 146 | 248 001 | 241 146 | 245 002 |
| Demand Penalty [$] | 4447.19 | 9.35 | 4447.16 | 0 |
| $J(\vec{x})$ [$] | 16 838 | 12 300 | 16 771 | 12 197 |
| % Difference | −1.21% | −27.83% | −1.60% | −28.44% |

Comparing the results across scenarios "a", "b", and "c" for Portfolio 1 highlights the dependence of synergistic effect on the conditions enforced during individual optimizations. Table 11 summarizes the achieved percent savings by the OPT cases for the investigated scenarios.

TABLE 6

Case 1 total percent savings summary.

| | No FR | | | FR | | |
|---|---|---|---|---|---|---|
| Scenario | Rs + Ls | (RL)p | Diff. | Rs + Ls | (RL)p | Diff. |
| a | −19.47% | −26.98% | 7.51 | −21.15% | −28.44% | 7.29 |
| b | −24.76% | −26.98% | 2.22 | −26.20% | −28.44% | 2.24 |
| c | −26.54% | −26.98% | 0.44 | −27.83% | −28.44% | 0.60 |

The NSU Rs+Ls case was identical for all scenarios, which allows for fair comparison between percent savings across scenarios. The portfolio results determined that for this specific portfolio construction (i.e. 120 retail, and 1 large office) the desired load reductions were optimally achieved when the load shift was performed entirely by the large office building. The individual demand limits set in scenario "c" lead to virtually the same solution as the portfolio optimization, thus only 0.4 to 0.6 percentage points of additional savings were observed when the buildings were simultaneously optimized. However, scenario "a" was quite the opposite of the optimal portfolio solution, and therefore the simultaneous optimization achieved 7 additional percentage points in total savings over the individually optimized case.

The nature of synergy observed in this case was anchored in the fact that performing demand reductions with the retail buildings required significantly more energy consumption. These results seem plausible when considering the characteristics of each building. The retail building has approximately 21% less internal thermal capacitance (per unit area), 23% higher average construction U-value (heat transfer coefficient), six times higher air infiltration flow rates, and 2.6 times greater internal gains (per unit area) than the large office building. All these factors combine to make passive thermal storage in the retail building much less effective and more costly.

Aside from the gains in total cost savings, which were mostly attributable to reductions in energy expense in this case, the observed energy savings were significant as well. Scenario "a," "b," and "c," portfolio optimizations were able to achieve the desired target demand while consuming 18.1%, 5.5%, and 1.2% less energy than the aggregated individual optimizations, respectively.

A second portfolio optimization case study was performed using medium office and large office buildings. Twenty medium office buildings were combined with a single large office building to create a portfolio where each building type has the ability shift equal amounts of load (i.e. approximately 800 kW). The twenty medium office buildings were assumed to be identical, and were included in the optimization through the use of a building multiplier to reduce problem dimensionality. Three scenarios were, once again, investigated to evaluate under which conditions synergistic effect might be observed. Scenario "a" represents the case where the medium office building receives a low TDL such that it would perform the entire load reduction desired by the portfolio. In scenario "a" the large office building receives a high target demand limit such that reducing peak demand is not of primary concern. Scenario "b" represents the case where the medium office and large office buildings split the desired portfolio demand reduction equally. Scenario "c" represents the case where the large office TDL is set such that it would be responsible for the entire portfolio demand reduction, while the medium office building receives a high TDL and need not reduce load. The target demand limits used to create these scenarios are shown in Table 12.

TABLE 7

Case 2 scenario target demand limits.

| | Target Demand Limit | | | |
|---|---|---|---|---|
| Scenario | Ms | Ls | (ML)p | Units |
| a | 6876 | 3013 | 9889 | kW |
| b | 7280 | 2609 | 9889 | kW |
| c | 7660 | 2229 | 9889 | kW |

Comparing the results across scenarios "a", "b", and "c" for Portfolio 2, highlights that the level of synergy was dependent on the conditions of the individual building optimizations before aggregation, as was observed for Portfolio 1. Table 13 summarizes the achieved percent savings by the OPT cases for the investigated scenarios. The NSU Ms+Ls case was identical for all scenarios, which allows for fair comparison between percent savings across scenarios. The portfolio results determined that for this specific portfolio construction (i.e. 20 medium office, and one large office) and simulation case the optimal operation was achieved when the load shift was split between the buildings. For scenario "b," the optimizer found individual building solutions that were very near the portfolio solution. Consequently, only a difference of 0.1 percentage points in total percent savings was observed. If the individual buildings had been under conditions such as scenario "a" or "c," slight synergy would exist among the portfolio.

TABLE 8

Case 2 total percent savings summary.

| | No FR | | | FR | | |
|---|---|---|---|---|---|---|
| Scenario | Ms + Ls | (ML)p | Diff. | Ms + Ls | (ML)p | Diff. |
| a | −40.84% | −41.50% | 0.66 | −45.05% | −46.24% | 1.20 |
| b | −41.63% | −41.50% | −0.13 | −46.15% | −46.24% | 0.09 |
| c | −40.60% | −41.50% | 0.90 | −45.28% | −46.24% | 0.96 |

The observed synergies in this example tend to hinge on the fact that both buildings voluntarily reduce demand in response to hourly prices when given a high target demand (i.e. no demand penalties). In scenario "a," the large office building would naturally reduce peak demand by 428 kW as a result of taking advantage of price arbitrage. Similarly, in scenario "c" the medium office building would reduce peak demand by 172 kW. When optimized individually, these voluntary load reductions remain undisclosed to the other buildings and cause greater load reduction than necessary. Put another way, the centralized optimization allows the voluntary demand reductions to be appropriated to the desired aggregate demand reduction, eliminating excess load shifting. Considering the total voluntary demand reductions available between both buildings gives an initial reduction of 600 kW, or 76% of the desired reduction. Only an additional 189 kW reduction needed to be encouraged via demand penalty. By making use of all voluntary load reductions, the portfolio optimizations in this example were able to achieve the desired TDL at lower energy consumption than the aggregated individual optimizations.

Aside from energy savings from the portfolio optimization, regulation revenue was also higher for the scenarios considered in this case. Striving to achieve large individual demand reductions tended to keep equipment or setpoints closer to operating constraints, resulting in less ability to provide frequency regulation when optimized individually.

Although the potential for interesting synergy was observed, the additional savings were somewhat small. Reductions in energy and increases in FR typically only resulted in approximately one percentage point increase in the total portfolio percent savings. This is likely due to the fact that the additional energy consumption often occurred during low priced hours and that regulation revenue was typically only one tenth (or less) of the magnitude of the energy cost. The observed 3% reduction in end-use electricity consumption, however, may be considered significant.

To explore the implications of building mass on the magnitude of synergy observed, Portfolio 2 was repeated for various combinations of building mass. Subscripts 0.5, 1, and 2, are used to represent the scalar applied to the original building mass (e.g. L 0.5 represents a large office with half of the original mass). Synergy was evaluated by comparing the portfolio optimizations to the aggregated individual optimizations. The results are presented in terms of percent difference between the portfolio and individual results, where negative values indicate the portfolio achieved a lower value. Table 14 shows the percent difference for optimizer total cost for scenarios "a", "b", and "c." To distinguish patterns between scenarios cell color is scaled across all scenarios. As expected, virtually no synergy was observed for scenario "b", since the individual optimizations found solutions nearly identical to the optimal solution of the portfolios.

Scenario "a" results show that the highest amounts of synergy occurred for the M0.5 cases and tended to decrease as the medium office mass was increased. This result is logical since scenario "a" is the case where the medium office was tasked with performing the majority of load reductions in the individual optimizations. Performing large load reductions in the medium office building with little thermal mass was less efficient, thus the M0.5 cases could benefit the most from splitting demand reducing duties with the large office building. As mass was added to the medium office buildings they became more efficient at load shifting and the benefit of portfolio optimization decreased. No synergy was observed in scenario "a" for the cases with the medium office mass doubled (M2).

TABLE 9

Percent difference in total optimizer cost.

|  | $L_{0.5}$ | $L_1$ | $L_2$ |  | $L_{0.5}$ | $L_1$ | $L_2$ |  | $L_{0.5}$ | $L_1$ | $L_2$ |
|---|---|---|---|---|---|---|---|---|---|---|---|
| $M_{0.5}$ | −1.33 | −1.54 | −1.47 | $M_{0.5}$ | 0.22 | −0.20 | 0.05 | $M_{0.5}$ | −1.68 | −1.40 | 0.01 |
| $M_1$ | −0.81 | −0.77 | −1.12 | $M_1$ | 0.30 | 0.14 | −0.04 | $M_1$ | −1.61 | −1.09 | −0.09 |
| $M_2$ | 0.03 | 0.29 | 0.14 | $M_2$ | 0.52 | 0.57 | 0.60 | $M_2$ | −1.54 | −0.80 | 0.40 |
|  |  | Scenario a |  |  |  | Scenario b |  |  |  | Scenario c |  |

Scenario "c" results show that the highest amounts of synergy occurred for the $L_{0.5}$ cases and tended to decrease as the large office individual optimizations. Performing large load reductions with the low mass large office building was less efficient, thus greater opportunity for savings existed through splitting demand reductions with the medium office buildings. As the large office mass was increased it became more efficient at thermal storage and virtually no synergy was observed for the high mass case (i.e. $L_2$).

A similar relationship was observed in the overall energy consumption, as shown in Table 15, suggesting that the majority of savings were related to energy savings rather than price arbitrage. It is also interesting to note that it appears that the energy savings tended to increase in scenario "a" as mass was added to the large office buildings. This may highlight the load shifting improvements of the higher mass large office building within the portfolio optimization. The opposite relationship was observed for scenario "c", however, with energy savings tending to decrease as mass was added to the medium office buildings. This is largely attributable to the fact that increasing the mass of the medium office building created significant additional start-up loads to reach the desired occupied setpoint, resulting in higher energy consumption for higher mass levels.

TABLE 10

Percent difference in energy consumption.

|  | $L_{0.5}$ | $L_1$ | $L_2$ |  | $L_{0.5}$ | $L_1$ | $L_2$ |  | $L_{0.5}$ | $L_1$ | $L_2$ |
|---|---|---|---|---|---|---|---|---|---|---|---|
| $M_{0.5}$ | −4.25 | −4.61 | −4.47 | $M_{0.5}$ | −0.91 | −1.32 | −1.32 | $M_{0.5}$ | −2.96 | −2.58 | −0.45 |
| $M_1$ | −3.43 | −3.64 | −4.73 | $M_1$ | 0.30 | −1.04 | −2.29 | $M_1$ | −2.46 | −1.93 | −1.07 |
| $M_2$ | −0.26 | 0.57 | −1.39 | $M_2$ | 0.52 | 0.89 | −0.07 | $M_2$ | −1.85 | −1.42 | −0.26 |
|  |  | Scenario a |  |  |  | Scenario b |  |  |  | Scenario c |  |

Overall, the results of the simulation study suggest that opportunities for synergy may be greater when low mass building are present within the portfolio, since they can potentially benefit from offloading some (or all) of their demand reducing duties to other buildings. Optimizing portfolios consisting entirely of high thermal mass buildings resulted in no observed synergy, since they can individually meet the desired demand reductions in a relatively efficient manner. The maximum synergy from a total cost perspective was observed in the $M_{0.5}$ $L_{0.5}$ case for scenario "c", which resulted in the portfolio optimization saving 1.68% over the aggregated individual optimizations. Although the total cost savings may not be entirely compelling, almost 5% energy savings was observed for several cases in scenario "a", which may be more significant Providing ancillary services through flexible load response has the potential to increase electric grid reliability and efficiency while offering loads a revenue generating opportunity. The large power draw of commercial buildings, along with thermal mass characteristics, has sparked interest in providing ancillary services through intelligent operation of building mechanical systems. As a precursor to participating in ancillary service markets, the quantity of service available must be estimated. The present invention presents a model-based approach for estimating commercial building frequency regulation capability. A model predictive control framework determines optimal operating strategies in consideration of energy use, energy expense, peak demand, economic demand response revenue, and frequency regulation revenue. The methodology is demonstrated through simulation for medium office and large office building applications, highlighting its ability to merge revenue generating opportunities with traditional demand and cost reducing objectives.

Overall, this invention has demonstrated the potential benefit of co-optimizing building participation in multiple grid markets. Furthermore, it was observed that synergistic effect can be achieved through optimization of building portfolios, although the magnitude and nature of synergistic effect may be case dependent. From the simulation studies performed it can be concluded that synergistic effect may result from a variety of pathways.

First, synergy may arise if a building is better at performing a specific task. In Portfolio Case 1, the thermal mass and envelope properties of the large office building made it inherently better than the retail buildings at passive thermal storage. Energy savings were observed when the large office building provided additional load reductions to account for the retail buildings target demand limits. This may suggest that the large office building should provide additional load reductions whenever possible, and that the retail buildings should only shift load when the large office building does not have the extra demand reducing capacity (i.e., peak days). This may also suggest that controlling one thermally massive building can account for the unoptimized operation of multiple inefficient buildings. In Portfolio Case 3, the large office could make larger voluntary demand reductions in response to energy pricing incentives, while the medium office building had greater capacity for providing FR. The optimization therefore determined that it was better to assign load reducing duties to the large office building and allow the medium office to pursue the opportunity to maximize FR participation.

Second, portfolio diversity may allow attainment of objectives at lower cost and energy. In other words, portfolios may not have to work as hard to achieve the same aggregate objectives. In Portfolio Case 2, the portfolio perspective allowed both buildings to utilize voluntary demand reductions made in response to real time pricing incentives towards peak reducing objectives. Individually, buildings were required to achieve greater load reductions since the voluntary load reductions of the other building were unknown.

Third, portfolio diversity may allow for greater FR. In seven of the nine scenarios investigated, the portfolio optimizations resulted in greater amounts of FR. Increased frequency regulation can result from the scenario where one building has excess FR capability, but is constrained by its demand limit; while the other building has space below its demand limit to provide more FR, but does not have the capability. Additionally, the multi-market optimizations showed that a buildings FR capability is strongly influenced by the thermal mass strategy since the trajectory informs where and when equipment and operational constraints may occur. It was observed that when a building is required to perform extreme load reductions it is often operating near setpoint or equipment limitations and, in general, has less flexibility to provide FR.

In addition to conclusions regarding how synergy may arise within building portfolios, the simulation studies discussed herein may be used to draw conclusions about the nature of synergistic effect in building portfolios as well.

First, synergistic effect may be dependent on the individual optimization conditions. In all portfolio optimizations the magnitude of observed synergy was dependent on the target demand limit of the individual building optimizations. If buildings were relatively similar as in Portfolio Case 2, and tended to peak on the same days (i.e., have similar peak shaving requirements), little opportunity for synergy was observed. However, if those same buildings peak on different days, synergistic effect may be possible.

Second, synergistic effect may be dependent on portfolio construction. Varying amounts of synergy from a variety of sources were observed in the portfolio optimizations. The least amount of synergy was observed in Portfolio Case 2 where the buildings were relatively similar, and the greatest amount of synergy was observed in Portfolio Case 1 where buildings had significantly different characteristics.

Third, synergistic effect may be dependent on grid market design. When peak demand was excluded from the optimizations there was no opportunity for synergy. For synergy to exist among building portfolios a joint objective must be in place, which may ultimately be defined by rate structures and the opportunities available within grid markets.

There are a number of challenges to using commercial building HVAC systems for FR: HVAC capacity limits, shaped (not constant/flat) HVAC electric use profile, the damping and reinforcing effects of interdependent HVAC components, coordinating a building portfolio, the building and portfolio optimization opportunity, and the requirement for an accurate building energy simulation model to manage these challenges both day ahead and in real-time.

First, HVAC capacity limits take many forms. For example, the offered FR and the next day's response to the FR signal:

Must honor comfort and air quality constraints; that is, may not degrade either comfort (e.g. by letting zone temperatures drift too far) or air quality (e.g. by limiting fresh air intake too much).

Cannot trigger chiller or AHU sequencing actions. Instead the FR signal must honor the boundaries of currently operating chillers and AHU's.

Cannot set a new monthly peak demand and cause a higher utility demand charge.

Must be consistent with commitments made to ISO emergency and economic demand response programs.

Second, shaped (not constant/flat) HVAC electric use profile means, as with generating plants, HVAC system operation changes intra-hour and hour to hour in response to varying electric prices, weather, and chiller staging. Similarly, FR capability also varies throughout the day as a function, for example, of weather and how much HVAC equipment is operating in response to the weather at any moment. As an example, the response available from air handling units depends on how many are operating in any given hour and at what part load ratio.

Third, the damping and reinforcing effects of the many interdependent HVAC components means that chillers, fans, pumps, zone dampers, and a myriad of automated operating protocols work in harmony. A change in one component may trigger either complementary or offsetting effects in others.

Fourth, coordinating a building portfolio improves both the magnitude and performance of FR services. Those benefits derive from harnessing diversity and from optimally allocating this resource, e.g. between slow and fast FR markets. Harnessing diversity requires i) bundling buildings with different but complementary HVAC components and differing performance, for example, with respect to FR capacity and response speed; and ii) taking advantage of the timing diversity, for example, with respect to capacity limits or part load ratios.

Fifth, the building and portfolio optimization opportunity means optimally redirecting the next day's building and portfolio operation to better provide FR services. For example, model predictive control (MPC) can harness thermal mass to force part load ratios that provide better FR performance in the most important hours. As another example, MPC can force building diversity where it doesn't naturally exist.

Sixth, a calibrated building energy simulation model is needed to accurately simulate hourly operation both day-ahead and in real-time in order to provide an accurate estimate day-ahead of building or portfolio FR and an accurate estimate real-time of building or portfolio baseline. Such models can i) anticipate capacity limits and their diversity within a portfolio and then propose next-day operating strategies for managing those limits that are not diversified; ii) determine shaped basepoints and forecast the FR capacity available to provide FR each hour of the next day; iii) capture the damping effects of all the interdependent HVAC components and do so for widely varying weather, prices, and other drivers of daily HVAC operation; iv) coordinate the diversity of a portfolio of buildings for better performance and better economics; and v) coordinate the participation of a portfolio of buildings simultaneously in ISO capacity, economy, and regulation markets.

We claim:

1. A method of controlling energy consumptive devices in at least one building, comprising the steps of:

generating a software model comprising a building energy simulation model of said at least one building;

simulating operation of at least one energy consumptive device in said at least one building over a simulation period of time in accordance with predicted circumstances over said simulation period of time and in accordance with a plurality of control plans using said software model to predict behavior of said at least one building;

for at least one of said plurality of control plans, re-simulating building behavior a plurality of times, each time with a different perturbation imposed, with each perturbation corresponding to a different degree of participation in a grid market, to thereby determine an amount of participation in said grid market available to said at least one building;

evaluating behavior of said at least one building associated with at least two of said plurality of control plans;

imposing a plurality of modifications on said predicted circumstances, each modification reflecting a different degree of participation in said grid market, and for each imposed modification simulating behavior of said at least one building in accordance with at least one modified control plan to determine an amount of participation in said grid market available to said at least one building;

evaluating behavior of said at least one building associated with each modified control plan;

selecting an optimal control plan in accordance with both of said evaluating steps; and controlling operation of said at least one energy consumptive device in accordance with the optimal control plan, said controlling step comprising generating for said at least one building a set of control signals for controlling operation of said at least one energy consumptive device, and providing a set of control signals to said at least one building.

2. A method of controlling energy consumptive devices in at least one building, comprising the steps of:

generating a software model comprising a building energy simulation model of said at least one building;

simulating operation of at least one energy consumptive device in said at least one building over a simulation period of time in accordance with predicted circumstances over said simulation period of time and in accordance with a plurality of control plans using said software model to predict behavior of said at least one building;

for at least one of said plurality of control plans, re-simulating building behavior a plurality of times, each time with a different perturbation imposed, with each perturbation corresponding to a different degree of participation in a grid market, to thereby determine an amount of participation in said grid market available to said at least one building;

evaluating (i) behaviors of said at least one building associated with at least two of said plurality of control plans and (ii) the re-simulated building behaviors;

selecting an optimal control plan in accordance with results of said evaluating step; and controlling operation of said at least one energy consumptive device, via a processor-based control system, in accordance with the optimal control plan, said controlling step comprising generating for said at least one building a set of control signals for controlling operation of said at least one energy consumptive device, and providing said set of control signals to said at least one building.

3. The method according to claim 2, wherein said grid market comprises frequency regulation.

4. The method according to claim 2, wherein said grid market comprises spinning reserve.

5. The method according to claim 2, wherein said grid market comprises day-ahead capacity.

6. The method according to claim 2, wherein said grid market comprises load balancing.

7. The method according to claim 2, wherein said perturbation comprises a forced energy demand reduction.

8. The method according to claim 2, wherein said evaluating step comprises comparing said building behaviors to determine a cost of participation in said grid market.

9. The method according to claim 8, wherein said evaluating step comprises determining a maximum amount of participation in said grid market, and wherein said determining step includes selecting a control plan in which participation in said grid market is at no more than said maximum amount.

10. The method according to claim 2, wherein said evaluating step comprises evaluating building behaviors corresponding to each of said different perturbations to determine a cost of participating in said grid market at a level corresponding to each of said perturbations.

11. The method according to claim 2, wherein each said perturbation comprises a constraint on optimization.

12. The method according to claim 11, wherein said constraint on optimization comprises an amount of demand variation to be held in reserve.

13. The method according to claim 10, wherein said controlling step comprises participating in said grid market at a particular level when revenue from participation in said grid market at said particular level exceeds said cost.

14. The method according to claim 2, wherein each said control plan comprises a sequence of control signals for controlling said operation of said at least one energy consumptive device over a planning period, each control signal controlling operation of said at least one energy consumptive device over a respective control period shorter than said planning period.

* * * * *